United States Patent
Singh

(10) Patent No.: US 12,112,653 B2
(45) Date of Patent: *Oct. 8, 2024

(54) SYSTEMS AND METHODS FOR PROVIDING TAILORED EDUCATIONAL MATERIALS

(71) Applicant: MINUTE SCHOOL INC., Waterloo (CA)

(72) Inventor: Tushar Singh, Waterloo (CA)

(73) Assignee: MINUTE SCHOOL INC., Waterloo (CA)

( * ) Notice: Subject to any disclaimer, the term of this patent is extended or adjusted under 35 U.S.C. 154(b) by 435 days.

This patent is subject to a terminal disclaimer.

(21) Appl. No.: 17/231,103

(22) Filed: Apr. 15, 2021

(65) Prior Publication Data

US 2022/0114903 A1  Apr. 14, 2022

Related U.S. Application Data

(62) Division of application No. 15/787,193, filed on Oct. 18, 2017, now Pat. No. 11,056,015.

(51) Int. Cl.
| | | |
|---|---|---|
| *G09B 7/08* | (2006.01) | |
| *G06F 16/951* | (2019.01) | |
| *G09B 5/06* | (2006.01) | |
| *G09B 5/12* | (2006.01) | |
| *G09B 7/07* | (2006.01) | |
| *G09B 19/18* | (2006.01) | |

(52) U.S. Cl.
CPC ............. *G09B 7/08* (2013.01); *G06F 16/951* (2019.01); *G09B 5/06* (2013.01); *G09B 5/065* (2013.01); *G09B 5/125* (2013.01); *G09B 7/07* (2013.01); *G09B 19/18* (2013.01)

(58) Field of Classification Search
CPC ............. G09B 5/06; G09B 7/08; G06N 20/00
See application file for complete search history.

(56) References Cited

U.S. PATENT DOCUMENTS

| | | |
|---|---|---|
| 6,270,352 B1 | 8/2001 | Ditto |
| 10,354,544 B1 | 7/2019 | Chernin et al. |
| 11,056,015 B2 * | 7/2021 | Singh .................... G09B 5/125 |
| 2003/0152906 A1 | 8/2003 | Krebs et al. |
| 2004/0063085 A1 | 4/2004 | Ivanir et al. |
| 2005/0196730 A1 | 9/2005 | Kellman |
| 2008/0187898 A1 | 8/2008 | Hattie |
| 2011/0177480 A1 | 7/2011 | Menon et al. |

(Continued)

OTHER PUBLICATIONS

WIPO, International Search Report and Written Opinion for PCT Application No. PCT/CA2017/051239 dated Jan. 23, 2018.

(Continued)

*Primary Examiner* — Jay Trent Liddle
*Assistant Examiner* — Alyssa N Brandley
(74) *Attorney, Agent, or Firm* — Norton Rose Fulbright Canada LLP

(57) ABSTRACT

Systems and methods are provided herein for selecting and providing educational content to a user. The content may be selected from content pools based on a user's individual characteristics, prior performance, aggregated student performance, and other factors. The system may also record behavioral data associated with the user to refine content selection for subsequent iterations. The system may also predict a student's results and the likelihood of passing or failing.

6 Claims, 44 Drawing Sheets

(56) References Cited

U.S. PATENT DOCUMENTS

| | | |
|---|---|---|
| 2011/0262890 A1 | 10/2011 | Kanemoto et al. |
| 2011/0264649 A1 | 10/2011 | Hsiao et al. |
| 2012/0208166 A1 | 8/2012 | Ernst et al. |
| 2012/0214147 A1 | 8/2012 | Ernst et al. |
| 2013/0157245 A1 | 6/2013 | Basu et al. |
| 2013/0209983 A1 | 8/2013 | Brown |
| 2013/0323691 A1 | 12/2013 | Voegeli et al. |
| 2014/0220540 A1 | 8/2014 | Burgin et al. |
| 2014/0272914 A1 | 9/2014 | Baraniuk et al. |
| 2015/0072330 A1 | 3/2015 | Rosenberg |
| 2015/0099254 A1 | 4/2015 | Kamimaeda et al. |
| 2015/0111192 A1 | 4/2015 | Mihai et al. |
| 2015/0379429 A1 | 12/2015 | Lee et al. |
| 2016/0078339 A1 | 3/2016 | Li et al. |
| 2016/0127010 A1 | 5/2016 | Rho et al. |
| 2016/0155346 A1 | 6/2016 | Wang et al. |
| 2016/0180248 A1 | 6/2016 | Regan |
| 2016/0189036 A1 | 6/2016 | Shakeri et al. |
| 2016/0217701 A1 | 7/2016 | Brown et al. |
| 2016/0300503 A1 | 10/2016 | Diezmann et al. |
| 2016/0379510 A1 | 12/2016 | Rainey et al. |
| 2017/0178531 A1 | 6/2017 | Swank et al. |
| 2017/0294134 A1 | 10/2017 | Angel et al. |
| 2017/0330474 A1 | 11/2017 | Rho et al. |
| 2018/0108268 A1 | 4/2018 | Singh |
| 2018/0137433 A1 | 5/2018 | Devarakonda et al. |
| 2018/0336792 A1 | 11/2018 | Cha |
| 2018/0357915 A1 | 12/2018 | Harlow et al. |
| 2019/0028492 A1 | 1/2019 | Coleman et al. |
| 2019/0333400 A1 | 10/2019 | Saini et al. |
| 2019/0385597 A1 | 12/2019 | Katsamanis et al. |
| 2020/0074874 A1 | 3/2020 | Lathrop et al. |
| 2020/0310900 A1 | 10/2020 | Hipp et al. |

OTHER PUBLICATIONS

USPTO, Office Action for U.S. Appl. No. 15/787,193 dated Dec. 10, 2020.

USPTO, Office Action for U.S. Appl. No. 15/787,193 dated Jul. 6, 2020.

USPTO, Office Action for U.S. Appl. No. 15/787,193 dated Dec. 19, 2021.

\* cited by examiner

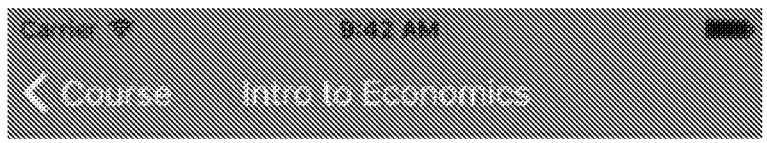
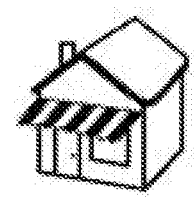
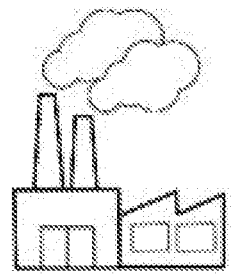
Economics is the study of factors that influence decisions on how to utilize resources for the production, distribution, and consumption of goods and services.
FIG. 33

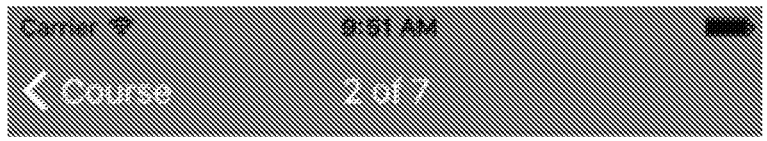
FIG. 38

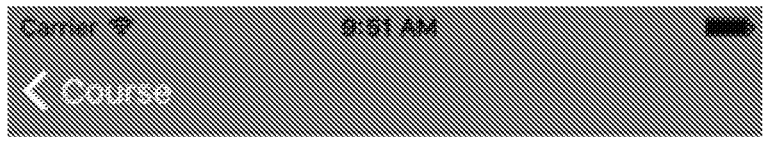

When modeling price and quantity what assumption do we make about factors that may affect them?

That they are constant/unchanging 

That they have slight variation

That they are not fixed ✕

By assuming that all other factors are fixed we can examine the relationship between price and quantity directly. If other factors are not fixed then they too must be included in all calculations and models.

FIG. 39

SYSTEMS AND METHODS FOR PROVIDING TAILORED EDUCATIONAL MATERIALS

CROSS-REFERENCE TO RELATED APPLICATIONS

This application claims priority to U.S. Provisional Patent Application No. 62/409,581, which was filed on Oct. 18, 2016, and is a continuation of U.S. patent application Ser. No. 15/787,193, filed Oct. 17, 2017, the entire contents of which are hereby incorporated by reference in their entirety.

FIELD

This disclosure relates to computer-implemented learning tools, and in particular, to systems and methods for delivering content to students.

BACKGROUND

Generation Z includes those born in the mid-to-late 1990s and onwards. Members of generation Z are frequently connected and communicating during nearly all waking hours using various mobile devices. On average, members of Generation Z consume 9 hours of media each day, with a preference for images and videos on mobile devices. Members of Generation Z tend to have short attention spans, typically around one-minute long.

One of the consequences of the above-noted characteristics is that students are having increasing difficulty learning using traditional educational models. Because of the structure of traditional school evaluations, educators and students often may not be aware that a student is struggling or otherwise performing poorly until an examination or paper is graded, by which point the student is already behind and remedial action is more difficult.

It would be desirable to provide a learning platform which provides students with an opportunity to learn in proactive or less reactive manner and which is tailored for students with shorter attention spans.

SUMMARY

According to one aspect, there is provided a method of presenting educational content to a user on a computing device, the method comprising: receiving content from a content pool, the content comprising a plurality of nodes; displaying, by a display device operably connected to the computing device, one or more of the plurality of nodes; and recording behavioral data associated with the user.

In some embodiments, the content pool is stored on a server separate from the computing device.

In some embodiments, the nodes comprise one or more of sections, lessons, documents, reference materials, videos and tests.

In some embodiments, the displaying comprises displaying a test to the user.

In some embodiments, recording the behavioral data comprises entering answers to questions on the test.

In some embodiments, the method further comprises transmitting the recorded behavioral data to a database.

In some embodiments, the method further comprises receiving unclassified content; and classifying the unclassified content based on previously classified content.

According to another aspect, there is provided a method of creating a course package for presentation to a user, the method comprising: receiving data relating to a user's performance in one or more lessons; determining the student's level of proficiency; selecting a plurality of content items from a content pool based on the student's level of proficiency.

In some embodiments, the method further comprises storing the plurality of content items in a database.

In some embodiments, selecting the plurality of content items based on the student's level of proficiency comprises selecting content items which are less likely to be answered correctly by the student.

In some embodiments, the student comprises a group of students.

According to another aspect, there is provided a method of predicting performance of a student in a course, the method comprising: receiving data relating to the student's performance on one or more evaluations; extracting, from the received data, characteristics of the student's proficiency; and determining, based on the characteristics, the likelihood of a student answering one or more questions in the course correctly.

Various embodiments of the invention will be further described with reference to the figures.

BRIEF DESCRIPTION OF DRAWINGS

In the figures, which depict example embodiments:

FIGS. 25-43 are example screenshots that may be displayed by a computing device.

DETAILED DESCRIPTION

Example embodiments of methods, systems and apparatus are described through reference to the drawings.

The following discussion provides many examples of embodiments of the inventive subject matter. Although each embodiments represents a single combination of inventive elements, the inventive subject matter is considered to include all possible combinations of the disclosed elements. Thus, if one embodiment comprises elements A, B and C, and a second embodiment comprises elements B and D, then the inventive subject matter is also considered to include other remaining combinations of A, B, C, or D, even if not explicitly disclosed.

Figure 1:
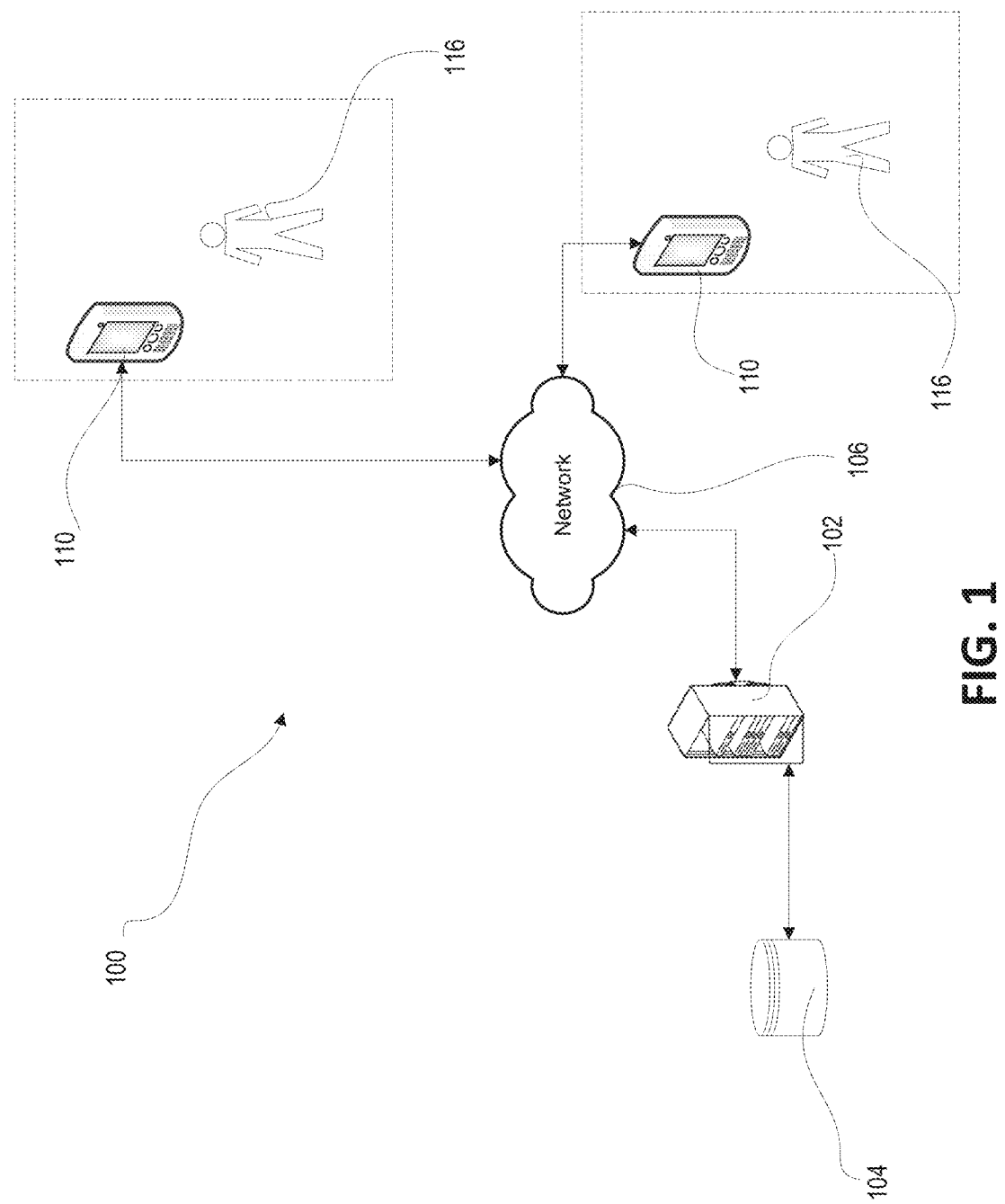
FIG. 1 is a block schematic diagram of an example educational system.

FIG. 1 is a block schematic diagram of an example educational system 100. Educational system 100 includes a server 102, with interconnected data storage 104. Server 102 may be interconnected to a network 106, which may be an IPv4, IPv6, X.25, IPX compliant or similar network, including one or more wired or wireless access points. Network 106 may be a local-area network (LAN) or a wide-area network (WAN), such as the internet, and may be connected with other communications networks, such as GSM/GPRS/3G/4G/LTE networks. Server 102 may host database data in its interconnected data storage 104. As depicted, educational system 100 includes a single server 102 with an interconnected data storage 104. However, in other embodiments, more servers 102 and data storage 104 may be present.

Sever 102 may communicate with one or more client computing devices 110 over network 106. Client computing devices 110 may be connected directly to network 106, or may be connected to network 106 by way of another network, which may be a LAN or a WAN such as the internet. Client computing devices 110 may be, for example personal computers, smartphones, smart watches, tablet computers, or the like, and may be based on any suitable operating system, such as Microsoft Windows, Apple OS X or iOS, Linux, Android, or the like.

Figure 2:
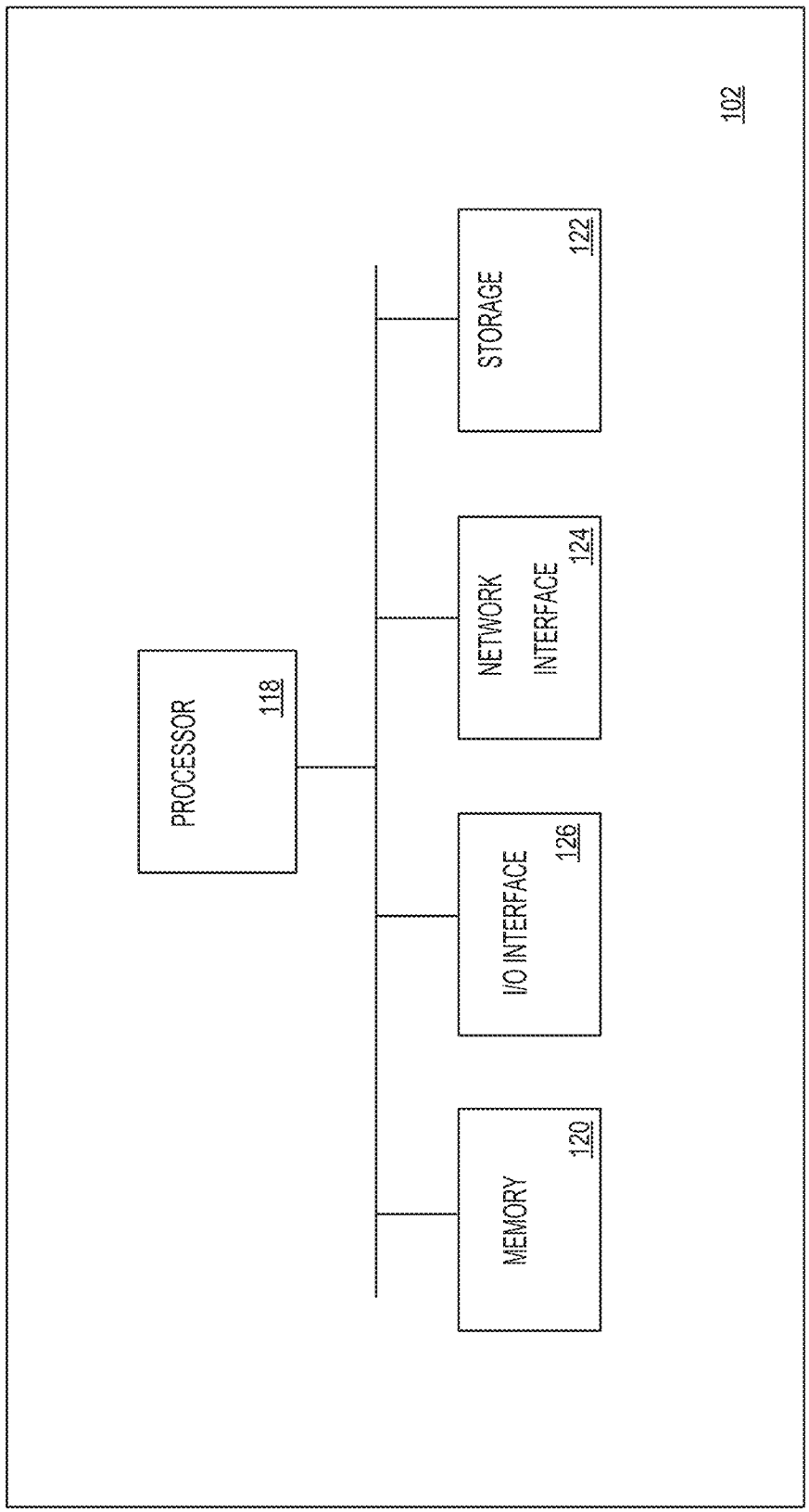
FIG. 2 is a block diagram of components of a server of the system of FIG. 1.

FIG. 2 is a block diagram of components of a server of the system of FIG. 1. Each server 102 includes a processor 118, memory 120, persistent storage 122, network interface 124 and input/output (I/O) interface 126.

Processor 118 may be an Intel or AMD x86 or x64, PowerPC, ARM processor, or the like. Processor 118 may operate under control of software loaded in memory 120. Network interface 124 connects server 102 to network 106. I/O interface 126 connects server 102 to storage 104 and may further connect server 102 to one or more peripherals such as keyboards, mice, USB devices, disc drives, and the like.

Software may be loaded onto server 102 from peripheral devices or from network 106. Such software may be executed using processor 118.

Figure 3:
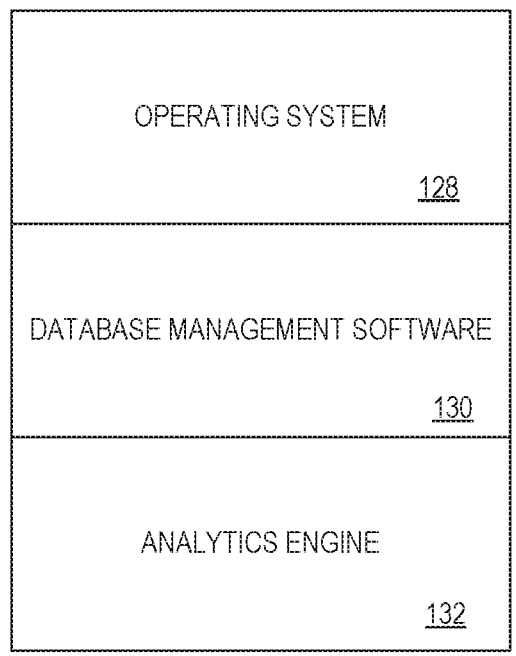
FIG. 3 depicts a simplified arrangement of software at a server.

FIG. 3 depicts a simplified arrangement of software at a server 102. The software may include an operating system 128 and application software. The application software may include a database management system 130 and an analytics engine 132. Database management system 130 may be a system configured for compatibility with the relational database model such as SQL. Analytics engine 132 is configured to analyze data stored in storage 104, for example, to identify correlations between data of different types and to identify user actions predicted to be associated with desired educational performance outcomes.

Figure 4:
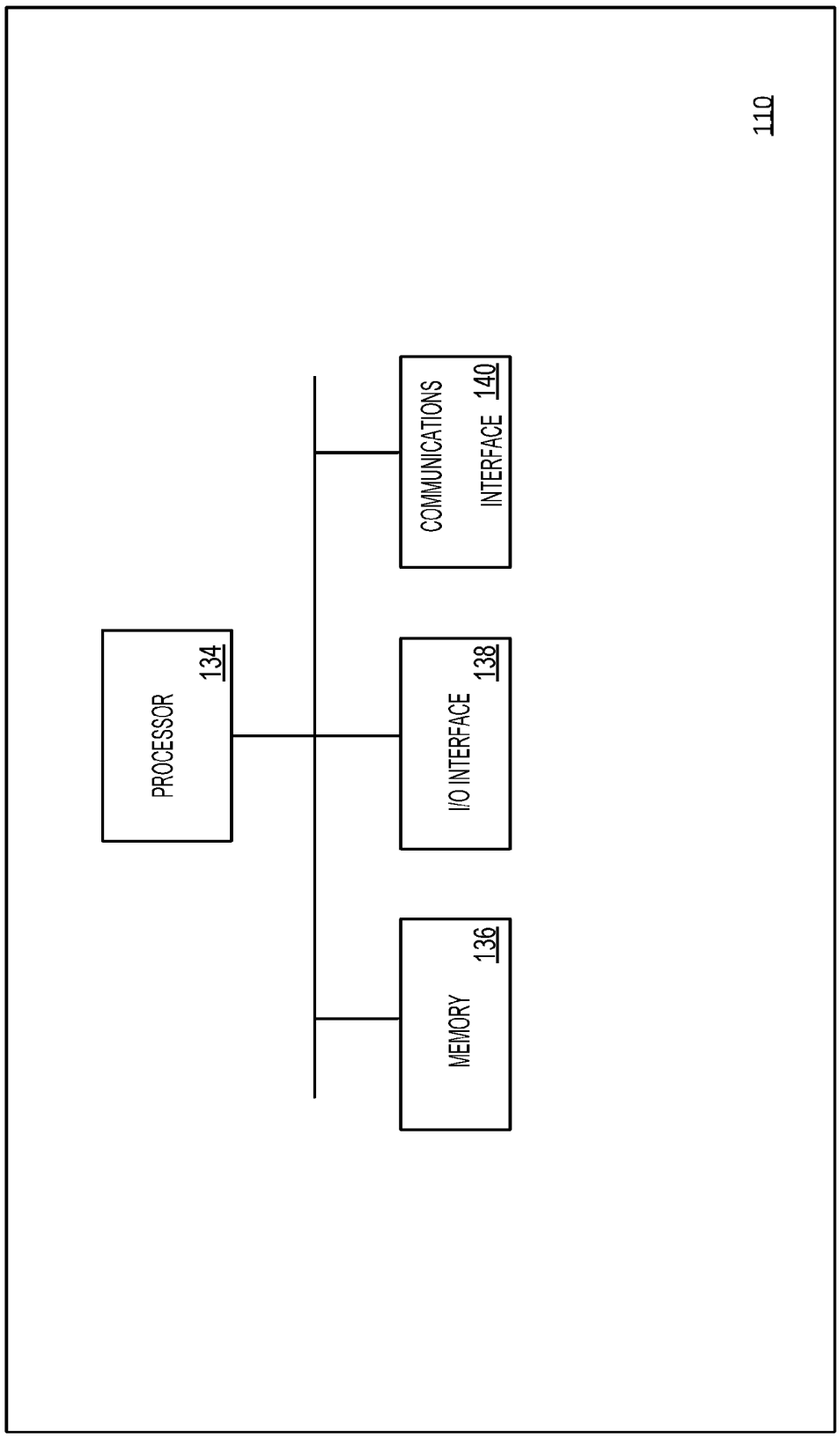
FIG. 4 is a block diagram of components of an example client computing device.

FIG. 4 is a block diagram of components of an example client computing device 110. As depicted, each client computing device 110 includes a processor 134, memory 136, persistent storage 138, communications interface 140 and input/output (I/O) interface 142. Processor 134 may be an Intel or AMD x86 or x64, PowerPC, ARM processor, or the like. Processor 134 may operate under control of software loaded in memory 136. Processor 134 may be configured to apply various algorithms, filtering, and/or other techniques in processing and/or transforming received signals and/or derived features.

Communications interface 140 connects client computing device 110 to other devices such as network 106 and server 102. I/O interface 142 may be further interconnected with one or more peripheral devices such as, for example, a smartwatch connected to the client computing device 110 via Bluetooth. However, other types of peripherals are possible, such as a stylus, a touchscreen, or the like.

Software may be loaded onto client computing device 110 from peripheral devices or from network 106. Such software may be executed using processor 134.

Figure 5:
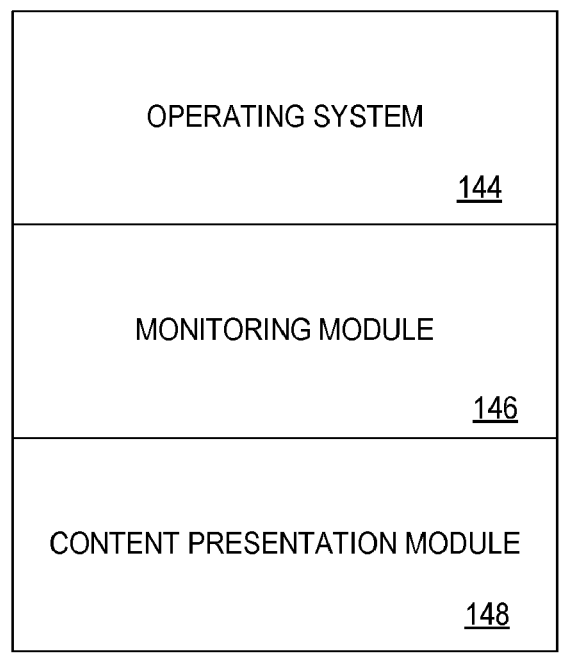
FIG. 5 depicts a simplified arrangement of software at client computing device.

FIG. 5 depicts a simplified arrangement of software at client computing device 110. The software may include an operating system 144 and application software. The application software may include monitoring module 146 and content presentation module 148. Monitoring module 146 may be operable to track user behavior, including the area of a touchscreen which is pressed by a user, the time taken between actions by the user, and various other behaviors as described herein. Content presentation module 148 is operable to present various types of content to the user through a user interface which may be implemented, for example, through operating system 144.

In an example, the client computing device 110 is operable to display content to a user. Such content may include educational content, which may include the presentation of courses or micro-courses to the user. Micro-courses are short lessons combined with frequent testing, which may allow users (e.g. students) to learn and immediately assess their understanding. In some embodiments, if the student's understanding of a micro-course is found to be lacking, the system 100 can focus on specific topics quickly rather than the student having to continue with material they are having difficulty in grasping.

Figure 7B:
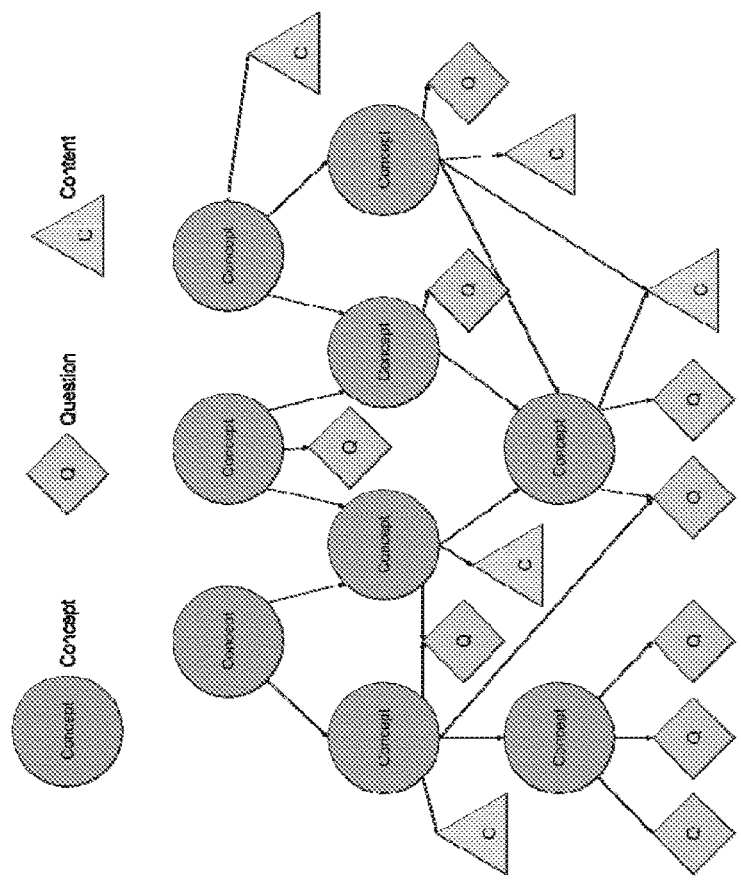
FIG. 7B is an illustration of an embodiment of a course represented by a graph.

In some embodiments, courses comprise a plurality of nodes arranged in a linear manner. The nodes can be a section, lesson, document, reference video, reference material, or test, or the like. Although courses comprise nodes arranged in a linear manner, the nodes can be customized, arranged, and consumed in any order, and may include duplicate items that are repeated throughout a course. In some embodiments, a course is embodied as a graph (as shown in FIG. 7B), wherein elements of the graph are displayed in a linear manner. In some embodiments, the elements in the graph may be nested. Such elements may include, for example, courses, concepts, sub-concepts, additional concepts, and content/learning material. In some embodiments, the elements may exist in a layered relationship. In some embodiments, the layered relationships allow nodes in a course can be customized, arranged, and consumed in any order.

Figure 6:
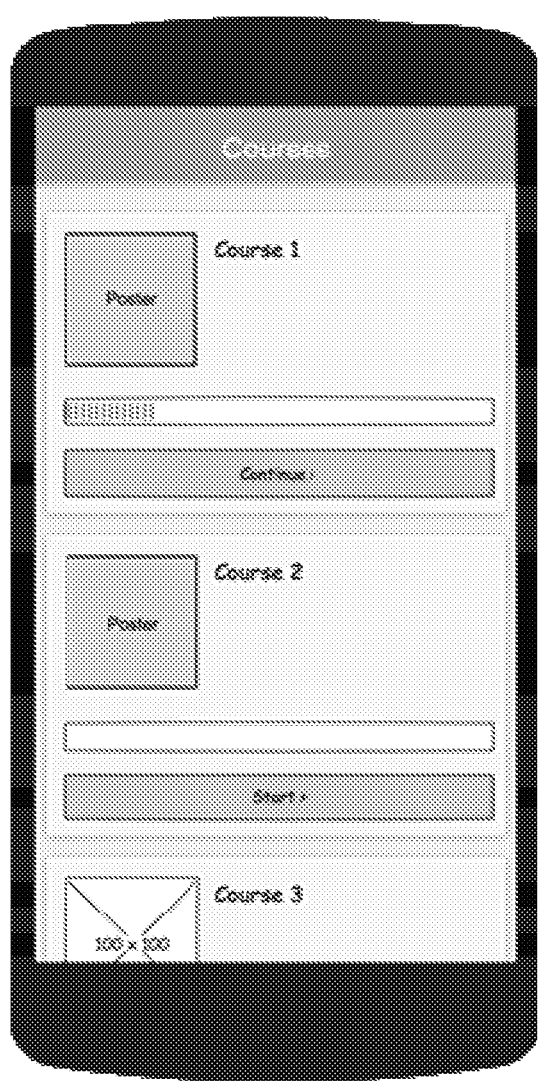
FIG. 6 is an illustration of a list of courses being displayed on client computing device.

FIG. 6 is an illustration of a list of courses being displayed on client computing device 110. As depicted, Course 1 605 has a progress bar 610 which indicates that it has already been started, and a Continue button 620 to resume taking Course 1 605. Course 2 635 has not yet been started, and so the progress bar 640 shows no progress, and a Start button 645 is displayed instead of a Continue Button.

Figure 7A:
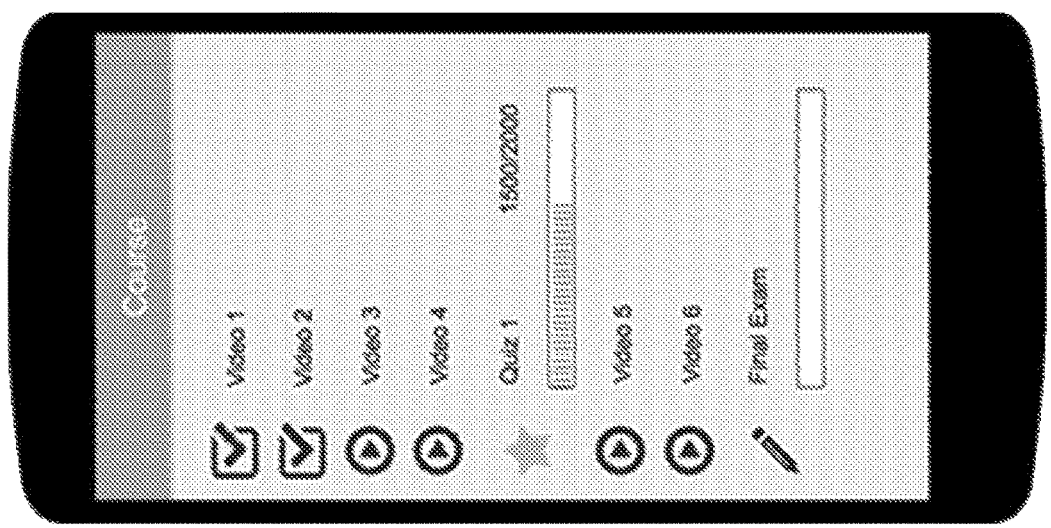
FIG. 7A is an illustration of a plurality of nodes comprising a course being displayed on client computing device.

FIG. 7A is an illustration of a plurality of nodes 705 comprising a course being displayed on client computing device 110. As depicted in the example in FIG. 7A, the nodes include videos, quizzes and exams. Progress bars 710, 720 may be displayed in association with various nodes to indicate a user's progress with a given node. FIG. 7B is an illustration of a course embodied as a graph 750. In some embodiments, elements of the graph 750 are displayed or structured in a linear manner. In some embodiments, the elements in the graph 750 may be nested. Elements may include, for example, courses 755, concepts 760, sub-concepts 765, additional concepts 770, and content/learning material 775. In some embodiments, the elements may exist in a layered relationship. In some embodiments, the layered relationships allow nodes in a course to be customized, arranged, and consumed in any order.

Figure 8:
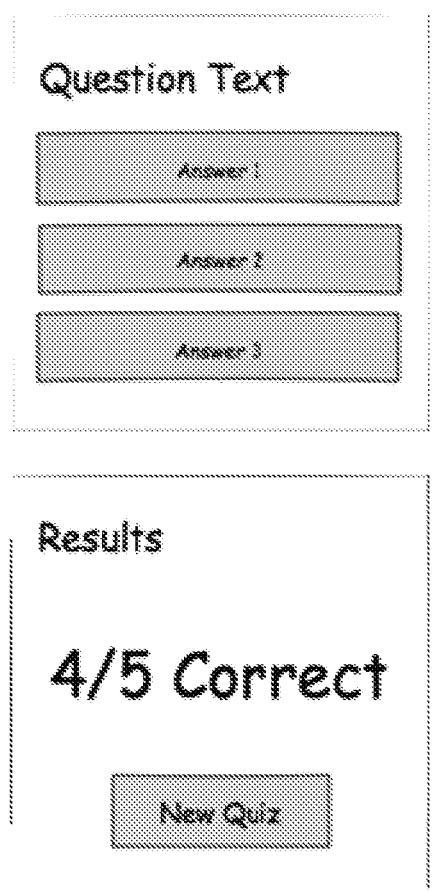
FIG. 8 is an illustration of an example user interface for taking a quiz using a smartwatch.

FIG. 8 is an illustration of an example user interface 805 for taking a quiz using a smartwatch. As depicted, the quiz 805 comprises question text and one or more buttons with multiple choice answers. Other types of questions are contemplated, and a quiz may comprise multiple questions. As depicted, the example quiz in FIG. 8 contained 5 questions, as shown in the results screen 810.

In some embodiments, courses comprise one or more video lessons. Video lessons may be displayed on, for example, the client device 110. Video lessons are a combination of a short video, for example a minute in length. The video may optionally be combined with slides that are displayed concurrently as the video plays. The presentation of the slides may be synchronized with the video to provide additional context.

Figure 9:
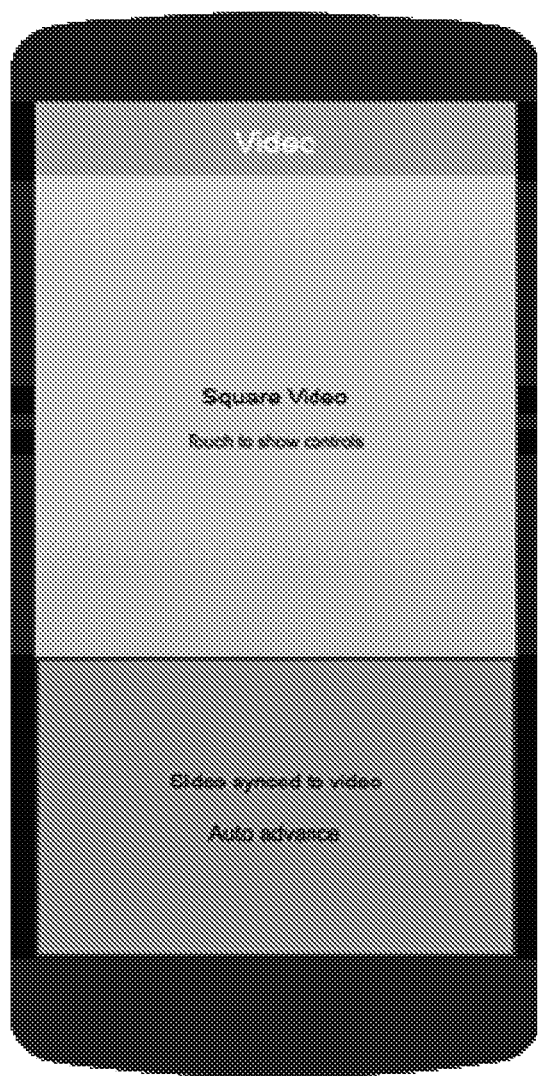
FIG. 9 is an illustration of the layout of an example video being displayed on client computing device.

FIG. 9 is an illustration of the layout of an example video being displayed on client computing device 110. As depicted, there is a first area 905 of the screen used for displaying the video, and a second area 910 for displaying associated slides.

Figure 10:
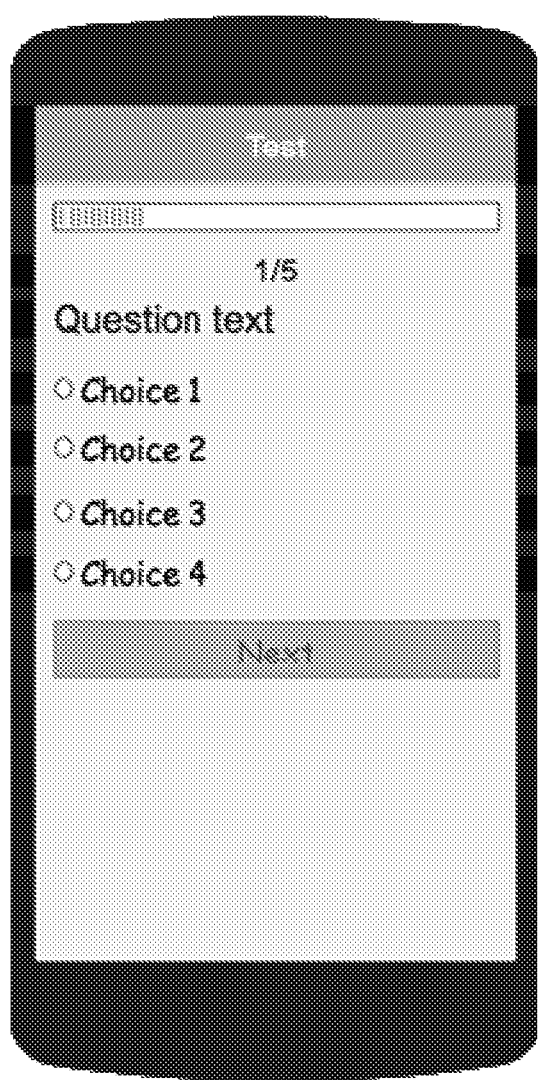
FIG. 10 is an illustration of a client computing device displaying a question from a test.

In some embodiments, courses comprise one or more tests. Tests are a type of node which comprise displaying a series of questions on client computing device 110 which can be answered using client computing device 110, for example via pressing buttons on a touchscreen. Tests may be timed, and may vary in length. For example, a quiz is a type of test which is relatively short in length, whereas an examination is a type of test which can be relatively long in length. FIG. 10 is an illustration of a client computing device 110 displaying a question from a test. As depicted, the example question 1005 has 4 multiple-choice options, as well as a Next button for proceeding to the next question in the sequence of questions in the test.

In some embodiments, a participant must answer every question in a quiz correctly in order to pass the quiz. In some embodiments, a longer test such as an examination may require a threshold score in order to pass, for example 90% correctness.

In terms of topology, tests may comprise a series of questions that are connected directly to a node. It should be appreciated that questions may be independent from a particular test and may connect to one or more nodes (e.g. concept nodes). Further, content may be independent and may connect to one or more nodes (e.g. concept nodes). Concepts may also connect to other concepts according to a parent/child or hierarchical relationship. A test can specify which lessons, sections or courses it is intended to test, and the questions selected for inclusion in the test are selected on that basis. In some embodiments, questions which are least likely to be answered correctly are chosen for inclusion in a test. Such tests would assess the knowledge that a student is least likely to possess. In some embodiments, the probability of a question being answered correctly is calculated based on analytics collected from each student who has previously answered a particular question.

In some embodiments, nodes select their content from a content pool. In some embodiments, graphs combine elements from a content pool to create courses and/or study plans. The content pool may be shared among all courses. In some embodiments, there may be a plurality of content pools which contain content for one or more courses and less than all courses. Sharing content for multiple or all courses in the content pool allows courses to include questions and concepts from related topics that may assist with the understanding of the current topic of the course. The content pool may be stored, for example, on data storage 104 and accessible via server 102 and network 106. Nodes may pull content directly from the content pool without requiring any additional data to specify how the content is composed.

In composing a test, the test refers to lessons or question sets and then specifies the number of questions to ask. A question set is a relatively small set of questions pertaining to the same topic. Combining multiple question sets from multiple topics can create a test which covers multiple topics. Both quizzes and larger tests for the same topic can use the same question sets.

Figure 11:
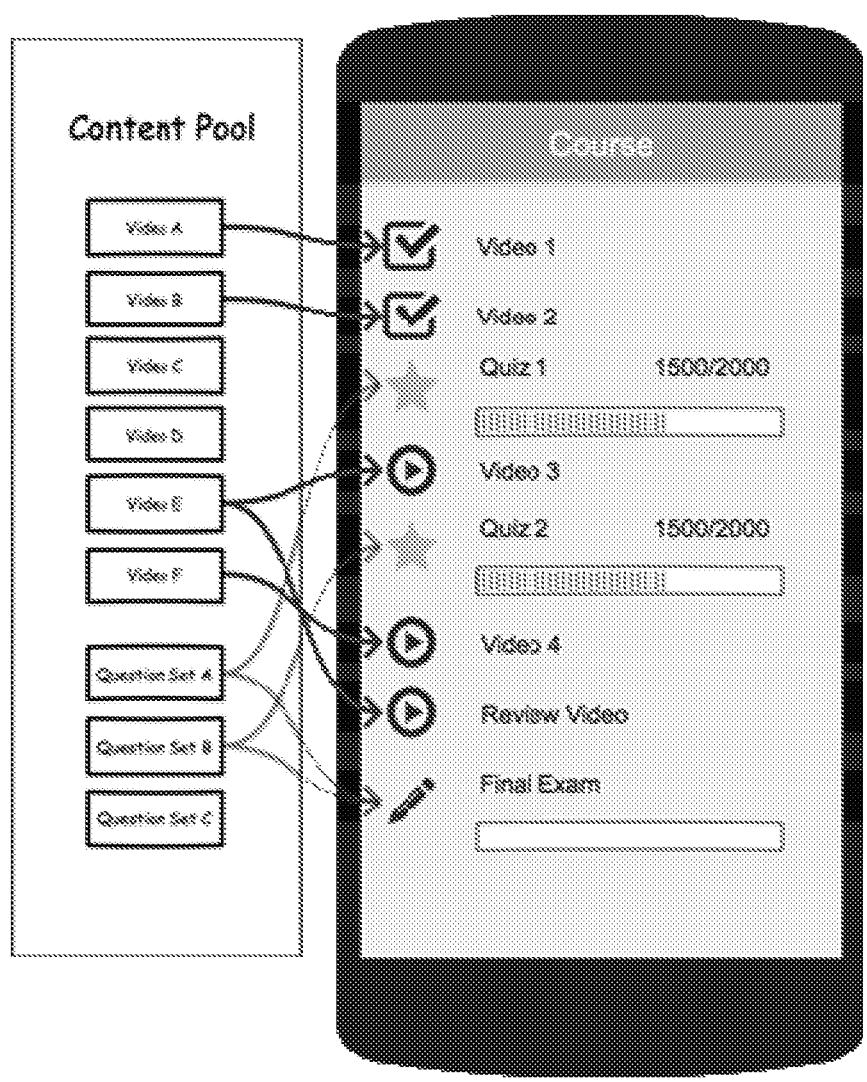
FIG. 11 is a graphical illustration of the relationship between content stored in the content pool and the contents of an example course.

FIG. 11 is a graphical illustration of an example relationship between content stored in the content pool and the contents of an example course or graph. As depicted, Videos A, B, E and F are included in the example course, while videos C and D are not. Similarly, question sets A and B are used in various quizzes and exams, while question set C is not.

In some embodiments, certain pieces of content may require prerequisites in order to be viewed or included in a course. In some embodiments, certain pieces of content can be recommended prior to accessing other content, without being strictly required. Prerequisites can be applied at the node level, such that when courses are being assembled, the prerequisites for the course can correspond to the prerequisites of some or all of the nodes contained within the course. When prerequisites exist for a given node, all of the prerequisite nodes may also be included within that course.

Figure 44:
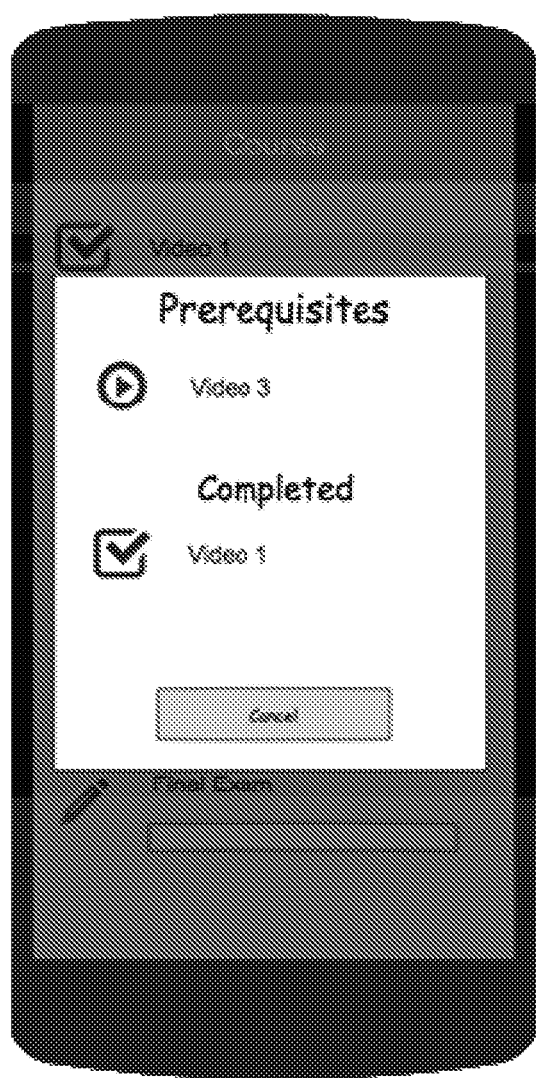
FIG. 44 is a graphical illustration of a display of an example computing device when a prerequisite has not yet been completed.

FIG. 44 is a graphical illustration of a display of an example computing device 110 when a prerequisite has not yet been completed. As depicted, the prerequisites for a given course are Video 1 and Video 3. Video 1 has been completed, while Video 3 must be completed in order to proceed.

It should be appreciated that specific types of content can be tailored to particular devices. For example, as shown in FIG. 8, a pop quiz can be administered on a smartwatch via an application running on the watch. Pop quizzes can be initiated without the student's request. In some embodiments, pop quizzes are triggered when a trigger condition is met. The trigger condition can include, for example, a certain amount of time having been spent on a course, a certain amount of time having been spent idle after having started a course, or the like.

Licensing

In some embodiments, course material can require a license in order to be accessed. Once a license has been obtained, the course can be accessed from server 102 or data store 104 and consumed by the student via computing device 110. Course material can also be licensed in an ad-hoc manner, such that the user may acquire content piece by piece, rather than paying a single price up front. An ad-hoc or "on-demand" licensing scheme may allow or encourage students with budgetary restrictions to begin learning smaller units of subject matter sooner, and then continue as the student's budget allows. It will be appreciated that as described herein, a license may be obtained in the form of a subscription. A subscription may include access to a set or subset of content and features. A subscription may be renewed periodically (e.g. weekly, monthly, quarterly, annually, or the like).

The system 100 may comprise a plurality of conceptual layers. The content layer may control the organization, delivery, generation, and consumption of content. The licensing layer may determine the pricing of each piece or content or collection of content.

Figure 12:
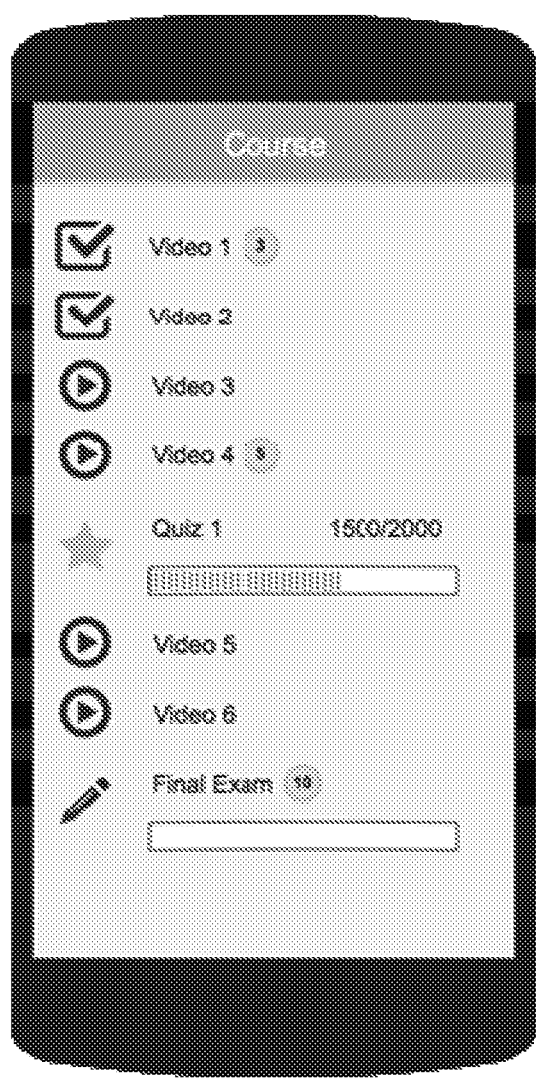
FIG. 12 is an illustration of an example course in which certain nodes require payment for access.

In some embodiments, content can be purchased or licensed on a node by node basis. That is, nodes which form part of a course may be purchased or licensed without having to purchase or license all of the nodes within the course. FIG. 12 is an illustration of an example course in which certain nodes require payment 1210 for access. In this example, Video 1 has a cost of 3 units, Video 4 has a cost of 5 units, and the Final Examination has a cost of 10 units. Units may correspond to one or more of currency, cryptocurrency, or credits (e.g. points earned by the user in other ways).

Figure 13:
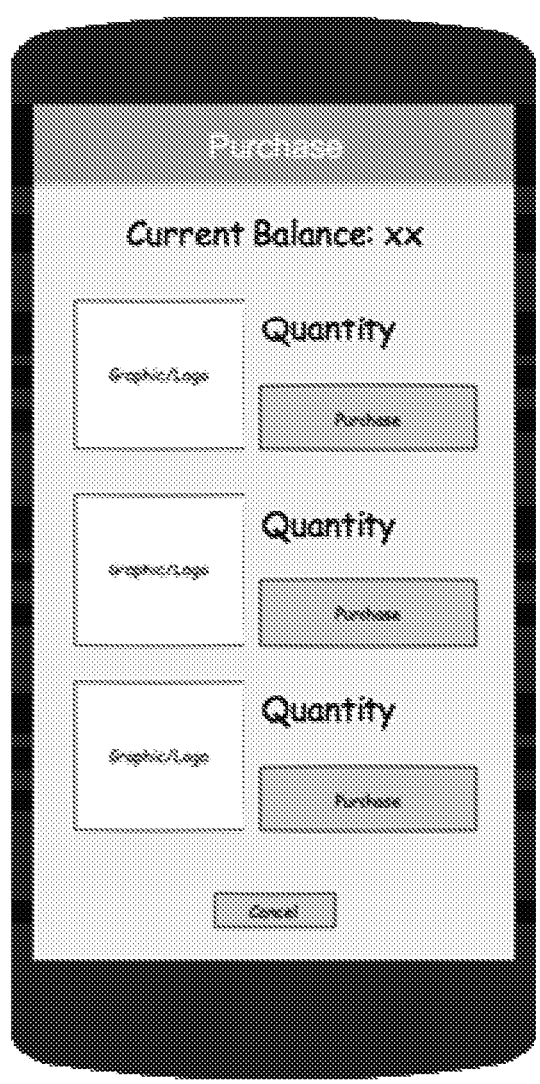
FIG. 13 is an illustration of an example purchasing area displayed on computing device 110.

An example license includes at least an identifier for the content to be licensed, a corresponding price 1210 for the license, and the length of time for which the license is valid. In some embodiments, a license can be valid indefinitely upon purchase. In some embodiments, licenses are purchased automatically when content is selected. If the user does not have a sufficient balance of money or points, the user can be taken to a purchasing area. FIG. 13 is an illustration of an example purchasing area displayed on computing device 110. As depicted, the user's current balance 1310 is shown, and a list of nodes or content 1320 is offered for purchase.

In some embodiments, the introductory portions of a course can be made free of charge for the user, which allows the user to preview or sample the content without committing financially. Moreover, the use of free introductory videos may obviate the need for "preview modes" or "sample modes", which may simplify the programming required for implementing the system 100 on computing device 110. In some embodiments, the content viewed free of charge can be given a license with a price of 0 and a limited time duration. Once the limited time duration has expired, the content provider has the option of adjusting the price associated with the content.

In some embodiments, licenses can be classified as one of "view" licenses and "consume" licenses. A view license can allow a particular node or content item to be viewed by the licensed entity. For example, a license to view a course or a node may allow a description of the course or node to be viewed by the licensee. A view license would provide sufficient information to the licensee to decide whether to consume the content or not. A consume license can provide authorization for various behaviors with the associated content. For example, a consume license could allow a video to be watched. A consume license could also allow questions on tests to be answered.

Licenses may also grant to a user the right to view content that is "hidden" from regular view. For example, a course may not be available to standard users through public listings. Such hidden content may be accessed by granting an individual license to a user and entering a code. Upon entering the code, the system 100 can then grant a view or consume license for the hidden content. Codes for hidden content can be useful in that they may enable longer term access to a full course, provide special courses through social media, or provide special courses for students in a particular group.

For example, promotional codes may be made available to users who are followers on social media accounts (e.g. Twitter, SnapChat, Facebook, or the like). Providing promotional codes through social media may give preferential treatment to users who engage with the system provider via social media and increase brand loyalty and affinity for the system provider.

Some embodiments may also provide special courses or content to users through the use of bots. Bots may be used in conjunction with communication applications including, but not limited to, Facebook, Kik, social networks, or the like. Such special courses could test a student through that communication application and indicate the student's proficiency directly through the bot conversation. Moreover, in some embodiments, a student or user may be enabled to send a request to a bot to be tested on a set of course content. The student may then receive feedback on-demand, either shortly or immediately after having taken the test.

In some embodiments, courses can be licensed collectively. Courses can also be grouped into course sets that can then be licensed as a group to a user. This may allow a set of "live" courses to be licensed to all students, while a set of "test" courses can be licensed to users involved in testing. Content groups can also be created for entire schools, allowing exclusive access to some content. The use of "live" and "test" groups can provide for efficient testing of new course content in a controlled manner.

Content may also be licensed to groups of users. For example, all students in a certain grade or in an entire school can be granted a "live" license for viewing all courses associated with the group license. Students in a single school, region, or any arbitrary grouping of students can be granted a license.

The combination of licensing of content in groups and the licensing to groups of users can simplify the process of licensing. In particular, the number of license definitions may be smaller in number, which allows for easier management of the licenses. This is particularly the case with "view" licenses, since "consume" licenses may still be specific to individual users.

A first example process for licensing comprises checking whether an initiating user has a license of a particular type for the target content. For example, if the initiating user is a member and the target content is a course, and the license is a "view" license, the following example process may include:

1) Placing the initiating user in an "expansion set";
2) If the expansion set is not empty, then:
   A) remove a user from the expansion set;
   B) place the removed user in a "check set";
   C) retrieve all of the groups for which the user added to the check set is a member;
   D) Put all of the groups into the expansion set; and
   E) Repeat step 2
3) After the step 2 loop has completed, the target content is placed in a "target expansion set";
4) If the target expansion set is not empty, then:
   A) remove a content item from the target expansion set;
   B) place the removed content item in a "target set";
   C) retrieve all of the groups with which the removed content item is associated;
   D) Place all associated groups in the target expansion set; and
   E) Repeat step 4
5) After the step 4 loop has completed, check if the "check set" is empty. If the check set is not empty, then:
   A) remove a user;
   B) check if the removed user has a license of a particular type on any item in the target set.
      i) If the removed user has a license, then stop and return the license;
      ii) if the removed user does not have a license, repeat step 5;
6) If the check set is empty at step 5), then a license does not exist.

A second example process can retrieve the content items which are licensed to an initiating user. Such a process has several uses, which include the ability to generate a list of courses for which a user has access. The second example method comprises:

1) Putting the initiating user into an "expansion set";
2) If the expansion set is not empty, then:
   a) remove a user;
   b) put the user in the "check set";
   c) retrieve all groups with which the user is associated;
   d) place the groups into the expansion set; and
   e) repeat step 2)
3) Once the loop in step 2) has been completed, check if the check set is empty. If the check set is not empty, then:
   a) remove a user from the check set;
   b) retrieve all content items licensed to the removed user with a target license type;
   c) place the retrieved content items into a "target expansion set";
   d) repeat step 3);
4) After the loop of step 3) has completed, check if the target expansion set is empty. If the target expansion set is not empty, then:
   a) remove a content item from the target expansion set;
   b) place the removed content item in a "target set";
   c) retrieve all groups that the removed content item is a member of;
   d) place all retrieved groups into the target expansion set;
   e) repeat step 4);
5) Return the target set.

The system 100 may further provide support mechanisms for students. Generally, achieving proficiency in a subject requires the student to engage with the content fairly often. Thus, it is important that students engage in a meaningful way with the content and are motivated to do so. A variety of motivation techniques would be desirable, as individual students may be motivated by different goals. For example, some students may seek to gain proficiency in a particular subject, while other students may want to compete and gain recognition as being the most knowledgeable in a subject. In either case, it would be beneficial for different types of goals to be supported by the system 100.

Some embodiments provide a support area which aims to encourage individual students through achievements, connect the students to instructors or peers, and provide adapted content to the students through recommendations and review courses.

For example, the system 100 may support an achievement mechanism which shows a student's progress, as well as major accomplishments (e.g. completing a course, or achieving a certain level of success in completing a course). Achievements can also be shared via social media (e.g. Facebook, Twitter, LinkedIn, or the like) networks to allow students to take pride in their accomplishments.

In some embodiments, system 100 uses a points system to track a student's progress. Points can be awarded for a variety of actions including, for example, the completion of each node of a course, assisting other students with problems, completing a course, logging into the system for a predetermined number of consecutive days, sharing items on social media, and the like.

Points also allow users of system 100 to compare themselves against each other in various contents. Users can compare themselves to other users at a content level by seeing who has achieved the most points in a particular course, set of courses, or all courses overall. Users can also compare themselves to other users within the same grade, school, geographic region, city, or the like. Such comparisons allow users to measure themselves in ways that they may not ordinarily be able to, which can foster a competitive attitude and enhance a user's motivation. Such comparisons may also provide perspective to users who are ranked at the top of their grade or school but not in the region, and provide a warning as to the competitive challenges that await in higher levels of education (e.g. high school, college, university, or the like).

Points may be awarded to users for a variety of reasons. For example, points may be awarded to a user when they have fully viewed a lesson. Points may also be awarded when a user achieves a passing grade on a test. Points may also be awarded when a user completes an evaluation (e.g. a quiz or test) within a predetermined amount of time. Weights assigned to different factors can be adjusted to emphasize the importance of those factors. For example, points may be awarded more heavily for answering questions on a test than points would be awarded for finishing a test quickly but with more incorrect answers.

An example process for assigning points is illustrated as follows:

On a test let s be the score percentage achieved and t the time taken. Let $P_{total}(s, t)$ be the total number of points gained attained for a test. Let p be the points attained for a pass. Let $P_{score}(s)$ be the bonus points attained for correctness. Let $P_{time}$ t) be the bonus points attained for speed of completion. Let $s_{pass}$ be the score needed for a pass.

$$P_{total}(s, t) = \begin{cases} 0 & \text{if } s < s_{pass} \\ p + P_{score}(s) + P_{time}(s, t) & \text{if } s >= s_{pass} \end{cases}$$

In order to calculate $P_{score}$ the range within which to scale a score bonus points is needed. Let $s_{max}$ be the score at which the bonus is maximized and the previously defined $s_{pass}$ as the minimum score. Let $b_{score}$ be the score bonus points available.

$$P_{score}(s) = \begin{cases} b_{score} & \text{if } s >= s_{max} \\ 0 & \text{if } s <= s_{pass} \\ \frac{(s - s_{pass})}{(s_{max} - s_{pass})} b_{score} & \text{otherwise} \end{cases}$$

Similar to the score bonus $P_{time}$ needs a time range to scale within, it also uses the correctness score to scale the time score. Let $t_{min}$ be the time at which the bonus is maximized and $t_{max}$ the time at which 0 bonus points are available. Let $b_{time}$ be the maximum time bonus points available and $P_{tc}(s)$ the correctness scaled time bonus points. Let R(t) be the percentage of points from the time bonus to award.

$$P_{time}(s, t) = P_{tc}(s)R(t)$$

$$P_{tc}(s) = b_{time}\frac{P_{score}(s)}{b_{score}}$$

$$R(t) = \begin{cases} 1 & \text{if } t <= t_{min} \\ 0 & \text{if } t >= t_{max} \\ \frac{(t_{max} - t)}{(t_{max} - t_{min})} & \text{otherwise} \end{cases}$$

In some embodiments, system 100 may also support the use of badges. While points provide a measurement of progress and overall rank, points do not indicate specific achievements. For example, a student may be the most talented in calculus, but weak in gym class. Specific achievements may be useful in distinguishing areas of interest, completion of specific challenges, and generally for providing motivation for completing objectives.

Many different types of badges can be awarded. New badges may also be created as new content is made available in the content pool. Some badges may only be earned once, whereas other badges can be earned multiple times. Some badges may be uniquely owned by one user at a time, while other badges may be awarded to multiple users. Examples of badges include: first video watched, multiple videos in the same course watched, assisted another student with a course for 4 consecutive days, or the like.

In some embodiments, a user is notified once an objective has been met and the badge has been awarded. In some embodiments, a badge notification is pushed to a user via notification, email, text message, or the like. For example, a badge can be awarded for having earned the most points in a particular month at a particular school. The calculations for this achievement occur externally to the user, and are not actively initiated by users. The winner of such a badge would be notified. In some embodiments, the winner of a badge is notified automatically. In some embodiments, some or all other users in addition to the winning user may be notified.

In some embodiments, system 100 further supports the use of flair. Flair may be useful in showing milestones for students. For example, a "star" may be awarded to a user according to the following table:

| Star | % Required |
|---|---|
| Bronze | 0%, must have passed the test |
| Silver | 90% |
| Gold | 98% |
| Platinum | 100% |

The use of flair stars may also serve to encourage students to consume content until they feel comfortable with their achievements. Flair is a mechanism that allows levels of accomplishment to be acknowledged. A star may be awarded to any user has achieved the requisite score, and differs from badges in that a flair achievement by one user would not have any impact on another user's ability to make the same achievement.

In some embodiments, system 100 further supports the use of trophies. Trophies can only be assigned to one user or entity at a time, making them exclusive in nature. Trophies can be awarded to a student, a group of students, a school, or the like. Trophies may be granted as a result of a competition, and system 100 may track previous winners and losers of trophies.

In some embodiments, system 100 further supports the general use of items. Items may be offered simply for participation or even randomly, and can provide motivation for less accomplished users to continue using the system 100. Such items may include, for example, stickers, hats, and gems or jewels. Such items may be discovered and awarded randomly throughout a student's progression. Items such as jewels may also be capable of consolidation once a sufficient quantity of the same item has been collected. For example, 10 diamond shards can be converted into 1 small diamond. 10 small diamonds may be converted into a larger diamond. Stickers can also be awarded randomly, but regularly enough such that collections of stickers can be created. Some stickers may be less likely to be awarded, and thus more rare.

In some embodiments, the system also provides peer-to-peer (P2P) support. While course content can be static in the short term, some students may require additional support or attention that directly addresses their individual needs. The system 100 may provide a mechanism for other students to provide support for individuals seeking assistance. The data obtained from peer-to-peer interactions may also be used to automate support mechanisms over time. In some embodiments, peer-to-peer support is encouraged by rewarding students who provide support with points or other incentives.

Examples of P2P support may include students creating content for other students. For example, a student may create content in the platform, attach the created content to one or more concepts or nodes, and then share the created content with others. By creating content for consumption by other students, content creators may receive points, coins, or other remuneration. Content creators may also receive credibility scores which can be utilized to improve the matchmaking capacities of the system 100 for P2P sessions.

The credibility score of a student or other content creator may be enhanced depending on how much other users make use of the created content. The credibility score of the student or other content creator may also be enhanced depending upon how much the created content is deemed to help improve understanding of a concept. The efficacy of created content may be determined, for example, by relating assessment outcomes (e.g. exam scores) of one or more students to the content consumed by the one or more students.

In some embodiments, content created by students or other content creators is stored in the content pool. The content may be used, for example, by artificial intelligence systems for inclusion in courses or other groupings of content.

To facilitate peer to peer support, a student seeking support should feel confident that they are receiving support from a qualified student. Students generally trust instructors because it is assumed that instructors have a certain degree of proficiency or mastery of a subject, thus earning the trust of the student. The system 100 can allow students to demonstrate their mastery of a subject through the use of points, badges, flair, trophies, and the like. The student wishing to provide support can display their points, badges, flair or trophies to users wishing to obtain support in order to inspire confidence. Students seeking support can in turn evaluate their peers who are offering support and accept support from those students in whose abilities they have confidence.

When a student is consuming course content, that student may have additional questions or areas of uncertainty. Within system 100, the student can post questions relating to the content. Other peers who have already consumed that content can be notified of the question posted by the student, and a reward bounty can be attached to a question and awarded to the best answer. In some embodiments, the best answer is selected by the student who posted the question.

Figure 14:
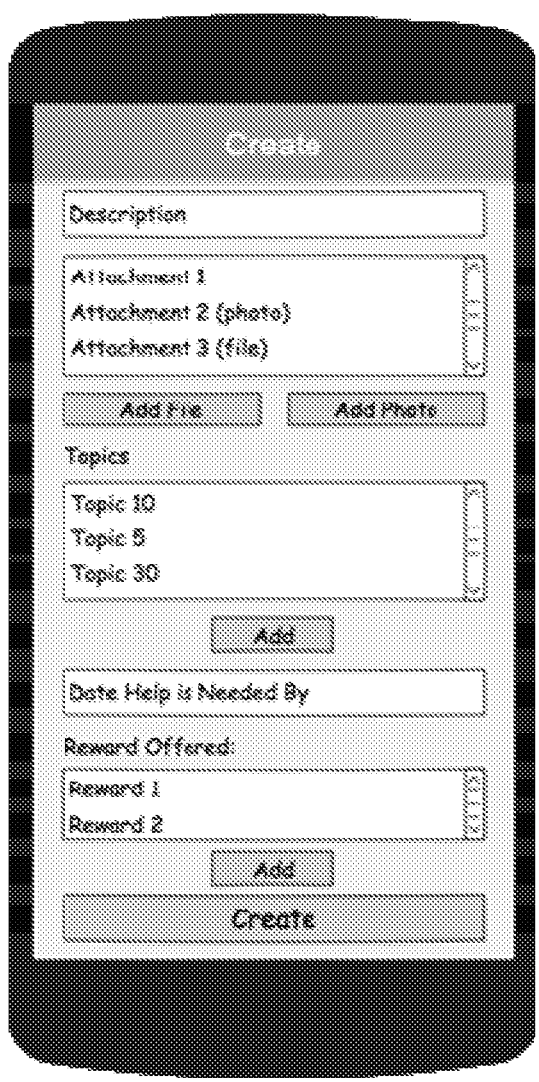
FIG. 14 is an illustration of a user interface on a computing device for posting a request for assistance.
Figure 15:
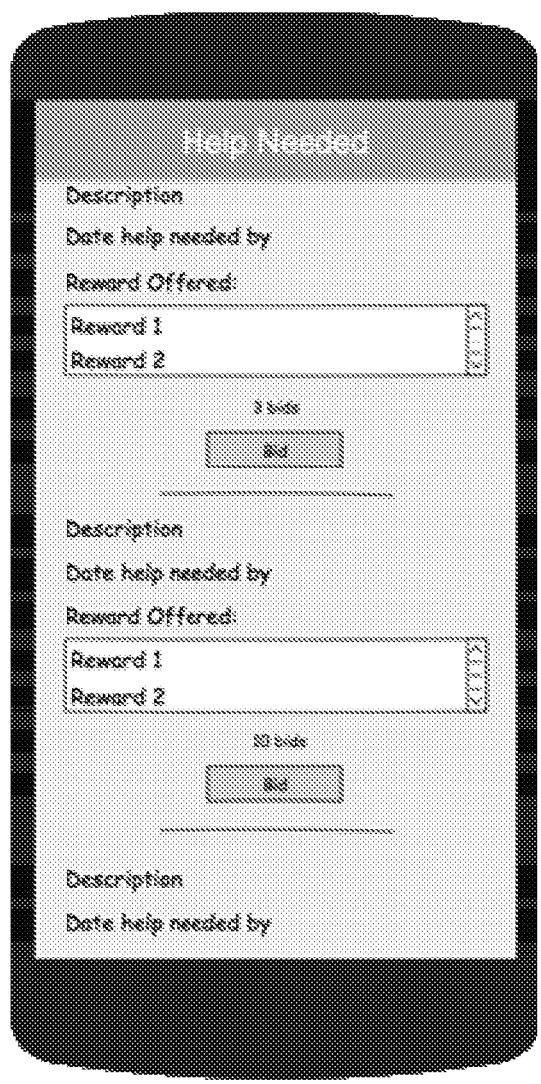
FIG. 15 is an illustration of an example of the Help Needed portal.

Aside from simply posting questions and receiving answers from supporters, students can also ask for assistance with specific items (e.g. editing and receiving feedback on papers). In some embodiments, students can submit assignments into a bidding environment in which potential supporters can request specific rewards. FIG. 14 is an illustration of a user interface on computing device 110 for posting a request for assistance. The posting student can attach one or more files 1405 (e.g. a document containing a paper), request help by a certain date 1410, and offer particular rewards 1415. The student's request can then be displayed in a "Help Needed" portal within system 100, which lists one or more requests for help 1510 with the pertinent information. An example Help Needed portal is shown in FIG. 15.

Figure 16:
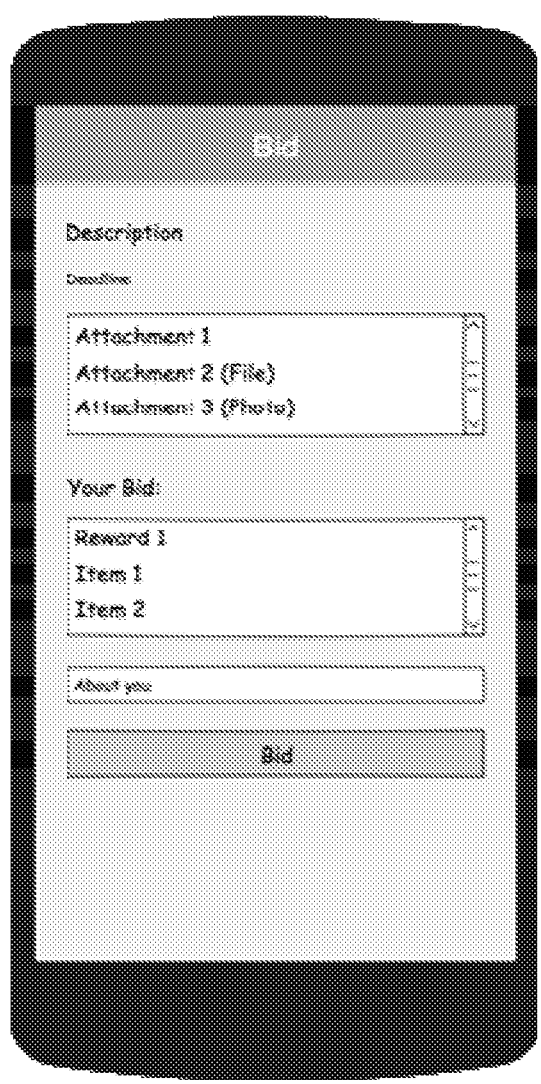
FIG. 16 illustrates an example user interface on a computing device for creating a bid for providing support.
Figure 17:
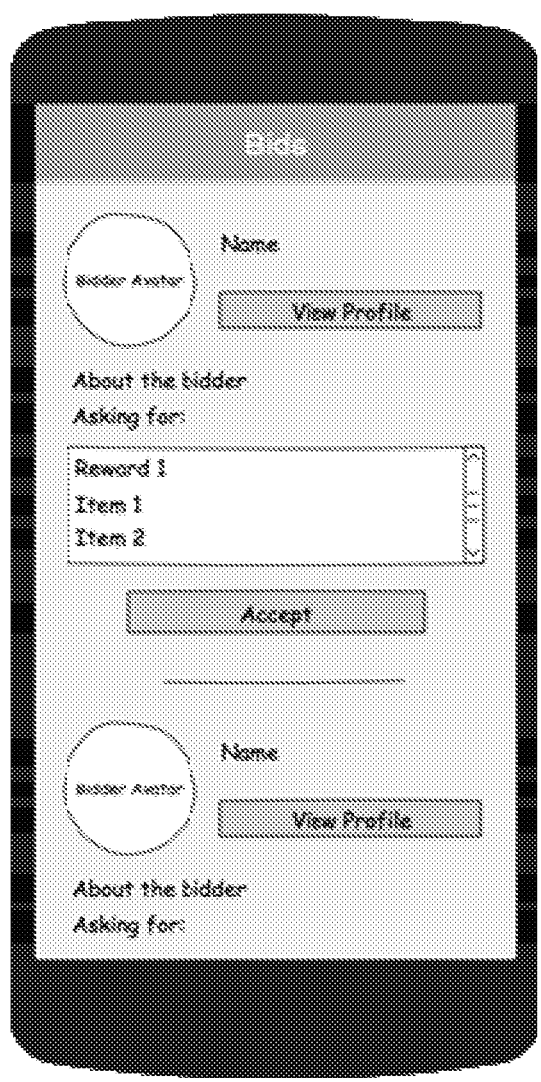
FIG. 17 illustrates an example user interface on a computing device.

In an example, a potential supporter can request a certain number of coins or other credit types in exchange for editing the poster's assignment. FIG. 16 illustrates an example user interface on computing device 110 for creating a bid for providing support. As depicted, the bidder can attach one or more files 1610, specify desired rewards 1615, and provide a description of their qualifications 1620. The various bids received from potential supporters can then be displayed in a bidding portal for selection by the student seeking support. FIG. 17 illustrates an example user interface on computing device 110. As depicted, one or more bids 1705 can be displayed with the pertinent details listed, including one or more requested rewards 1710, an avatar 1715, and a link to the profile of the student offering their support 1720. The posting student can then select one or more offers from potential supporters and the rewards are deducted from the posting student's account and delivered to the supporter's account once the requested assistance has been provided.

Figure 18:
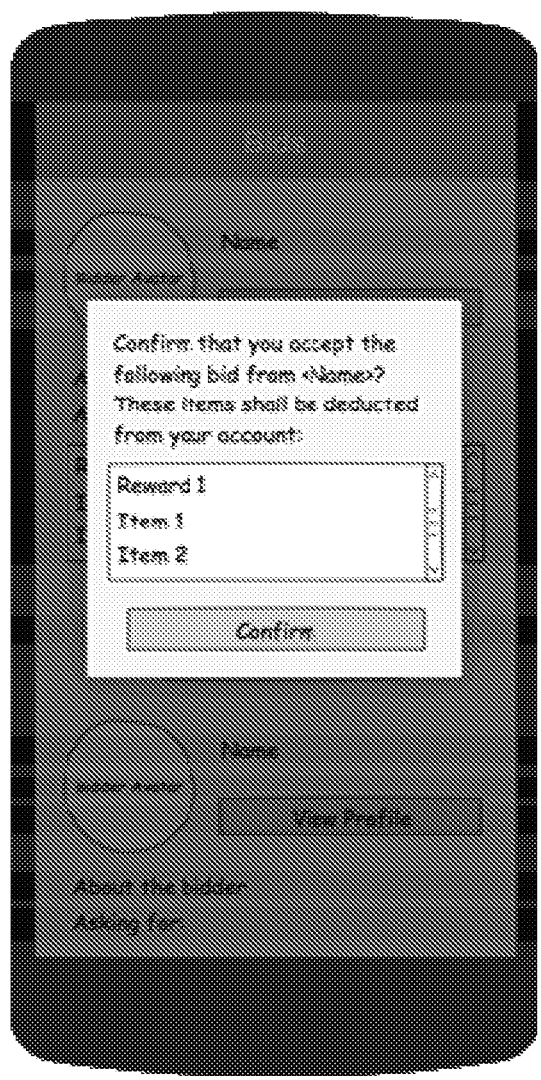
FIG. 18 shows an example confirmation screen which may be displayed on a computing device when a student seeking support chooses to accept a bid.

FIG. 18 shows an example confirmation screen 1810 which may be displayed on computing device 110 when a student seeking support chooses to accept a bid. As depicted, the student accepting the bid will confirm that the rewards will be deducted from their account.

Some embodiments of system 100 allow a supporter to deliver live lessons for specific subjects. It should be appreciated that the supporter can offer a live lesson to other users without the users needing to have requested support for that topic. When a supporter offers a live lesson, the system 100 may notify users who may be interested and provide the option to attend. Supporters may also offer private sessions that are exclusive to a particular student or group of students.

Some embodiments of system 100 allow supporters to create and post content for sharing with other users. Such created content can be associated with a requisite fee and licensed, as with other content in the content pool described above. A benefit of allowing supports to create and post content is that the needs of students can be met in a timely fashion when it is clear that one or more students are having difficulty with a particular topic. For instance, one or more low test scores obtained by one or more students within a certain time period can signify to the analytics module that a lesson tailored to that topic would be beneficial. In some embodiments, system 100 can notify supporters of such a need for additional support on that topic.

Consumers of the user-created content can also provide gifts to content creators as a show of appreciation. Gifts can include items or currency, or any other suitable form of compensation.

Some embodiments of system 100 support the use of transaction fees. For example, transaction fees may be applied in addition to the fees for course content and could also be applied on peer-to-peer transactions, as well as competitions. Transaction fees could also be paid by users receiving rewards from other users. Such transaction fees could be paid as a flat rate amount, a percentage of the reward or cost, or a combination thereof.

Some embodiments of system 100 also support the purchase of gift cards or other perks. Perks may be found in an online store, and may also be limited in quantity to particular regions or user demographics. Perks may be useful in providing continued motivation to users who have attained a greater point balance than they have use for.

Some embodiments of system 100 allow students to interact with instructors. Instructors can provide feedback to students directly with an aim to improving that student's performance. Instructors can also message students. In some embodiments, instructors can be other students. Instructors can be rated by students with respect to, for example, the instructor's helpfulness, clarity, attitude, or the like.

In some embodiments, instructors have access to analytics and assessment data for a particular student in a particular course. This performance data allows the instructor to provide additional advice, share links, and suggest content for that student to review to enhance their learning. The instructor may also offer additional assistance using other system tools in exchange for rewards or fees.

Instructors that are assisting multiple students within a single course or group of courses can organize the students by course or group of courses. Analytics associated with the course or group of courses can be aggregated, with can provide instructors with trends on a broader (or macro) level. Messages and content can also be distributed to the entire group rather than on an individual basis.

Some embodiments of system 100 allow the support interactions between students and between students and instructors to be tracked any analyzed. When instructors and students evaluate the assistance provided, the analytics engine can gain insight into what methods and content were most effective in helping the student understand the content. Insights may be specific to an individual user, or group of users, as the case may be. Using the analytics engine, system 100 may generate automated support features that can provide students with a high quality of support when the students need additional support.

One of the goals of some embodiments described herein is to maximize assessment outcomes by supporting students, instructors, and their peers proactively and in real-time. System 100 may accomplish this by understanding content, activity data, and interactions to create content. Machine learning techniques may be used in creating content. Content creation can be tailored to specific users or to groups of users.

In some embodiments, the system 100 is configured to provide a learning environment, deliver content, enable interactions, and capture activity data. Additional content, interactions, and activity data may be gathered from the internet, as well as links that are shared with the learning environment, and social media accounts which correspond to users and institutions. An evaluation engine can receive some or all of the aforementioned elements and create models of content, learners, instructors, and peers. These models can be tailored to specific contexts and can be created at both the macro (e.g. groups) and micro (e.g. individual) levels. These models can then be used to interact with users in the learning environment or on the Internet.

Figure 19:
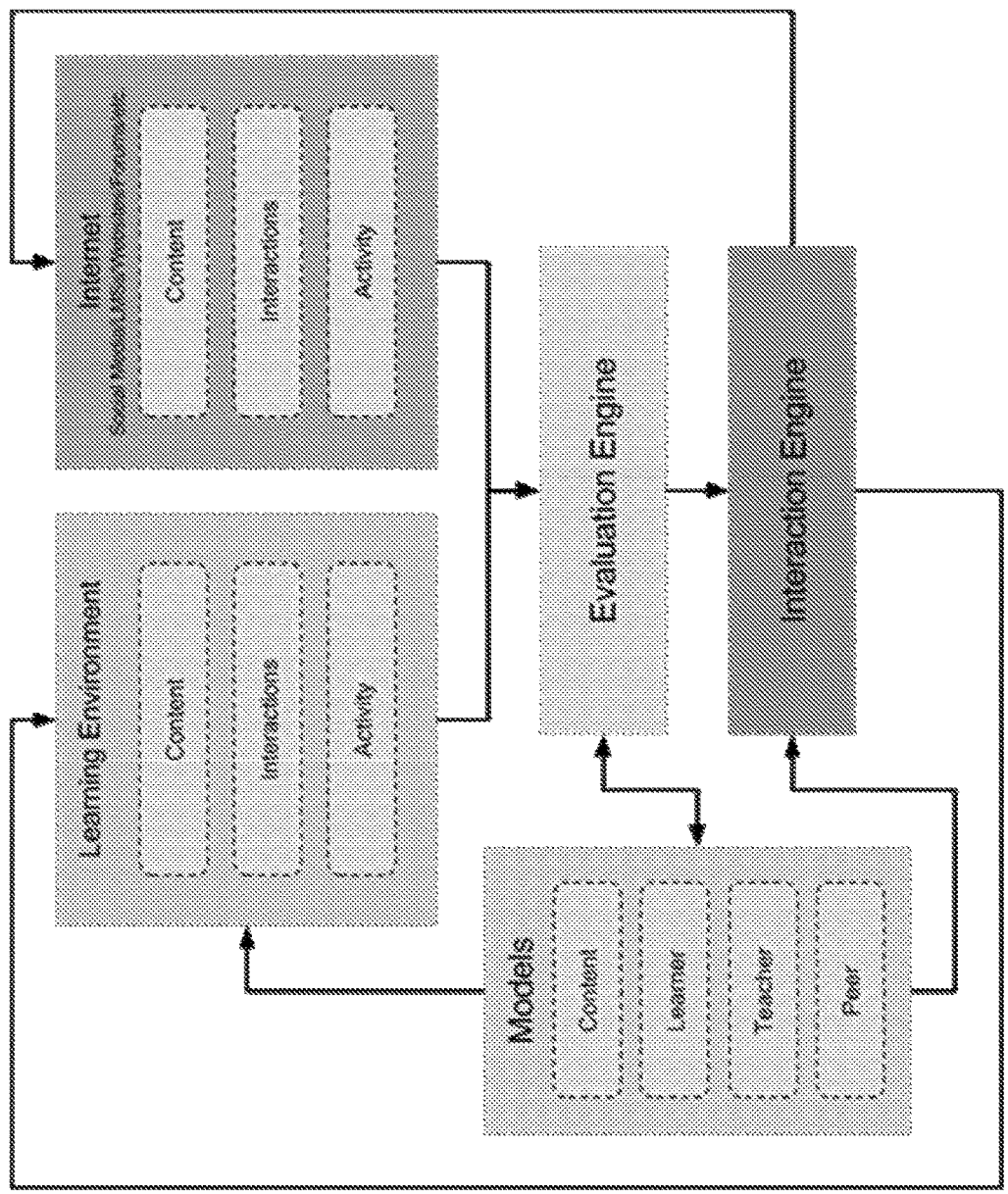
FIG. 19 is a block diagram illustrating an example high-level automated support architecture for a system.

FIG. 19 is a block diagram illustrating an example high-level automated support architecture for system 100. As depicted, the system comprises an evaluation engine 1905, an interaction engine 1910, models 1915, a learning environment 1920, and the internet 1925. The models 1915 further comprise content 1916, learners 1917, teachers 1918 and peers 1919. The learning environment 1920 further comprises content 1921, interactions 1922, and activities 1923. The internet 1925 further comprises content 1926, interactions 1927, and activities 1928 obtained through one or more of social media, websites, forums, learning management systems (LMSs), and the like.

Content Selection

According to one aspect, the system 100 can categorize and classify content. Content may be at the core of the system 100 and may be a primary element that users engage with in order to learn. The ability to categorize content may allow for a model for other parts of system 100 to use for interaction or further model building. By starting with a content model, the system 100 can categorize both content found in the content pool, as well as content found from other sources (e.g. the internet, YouTube videos, or the like).

Logically, content can be classified in accordance with the following principles:

Let T be an ordered set of all categories with $n=\|T\|$. For a piece of content, C, let $\hat{W}$ be a n dimensional unit vector of the relative weight of each category in T.

Content is divided into three sets: labeled($S_l$), unlabeled ($S_u$), and grouped content($S_g$). Labeled content, such as lessons, consists of the content created for the learning environment that is tagged with one or more categories from T. Unlabeled content, such as webpages or interactions, lack any tagging of categories. Finally, grouped content, such as courses, consist of labeled, unlabeled, and other grouped content.

For each $C \in S_l$, let $T_C$ be the set of tagged categories and $\hat{W}_C$ the weight vector.

$$\hat{W}_C = \{t \in T | U(t)\}$$

where U(t) is defined as:

$$U(t) = \begin{cases} \frac{1}{\sqrt{\|T_C\|}} & \text{if } t \in T_C \\ 0 & \text{otherwise} \end{cases}$$

For a piece of grouped content, $C_g$, the weight vector, $\hat{W}_g$, can be determined as follows. Define $C_g=\{C_1, C_2, \ldots, C_m\}$ where $C_i$ is a piece of content with a weight vector. Let $W_{CG}=\{W_1, W_2, \ldots, W_m\}$ where $W_i$ is the unit weight vector for $C_i$.

$$W_g = \sum_{W_i \in W_{CG}} \frac{W_i}{\sqrt{\|S_g\|}}$$

$$\hat{W}_g = \frac{W_g}{\|W_g\|}$$

The above-noted logic provides a more formal example definition of content and the weight vectors that may be applied when all content items are labelled or have weights. However, when content is not labelled, a process may be used to create labels. Some embodiments of such a process make use of machine learning principles, with one or both of feed-forward neural networks (FFNN) and recurrent neural networks (RNN). FFNNs can be used for non-sequential pattern recognition and classification. RNNs can be used for sequential pattern recognition and classification. The output from both RNNs and FFNNs may include a category weight vector for a content item. Combinations of FFNNs and RNNs may be used to separate inputs, classify the inputs, and then combine the classifications.

Some embodiments of the present invention employ deep neural networks. Deep neural networks are an artificial neural network with multiple hidden layers of units between the input and output layers. Deep neural networks can be used to model complex non-linear relationships. The extra layers of units may enable the composition of features from lower layers, which provides the potential of modelling complex data with fewer units than a similarly performing shallow network.

Figure 20:
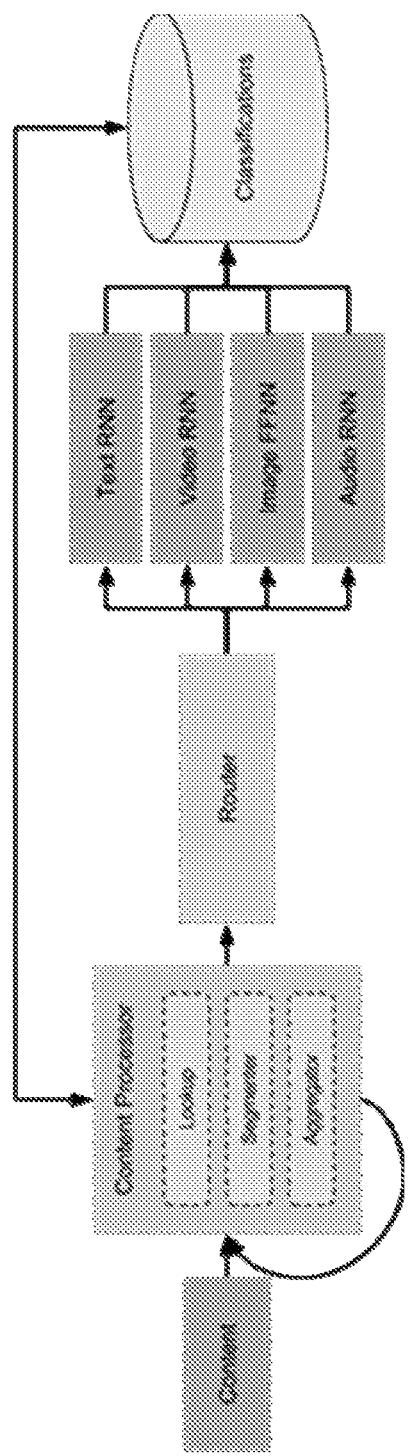
FIG. 20 is a block diagram of an example process for classifying unclassified content items.

FIG. 20 is a block diagram of an example process for classifying unclassified content items. As depicted, the process begins with a content item 2005 and an identifier being passed into the content processor 2010. The content processor checks to see if a classification already exists for the content item 2005. If a classification already exists, then no further processing is required.

If a classification does not exist, then the processor attempts to segment the content item 2005 into smaller types that comprise a content group. For example, a course could be segmented into lessons and tests, while video lessons could be further segmented into text and video blocks. The resulting segmented content may then be fed back to the content processor for classification.

When all segments of a content item are classified, then the top level content item's classification vector is calculated and stored. Base classes of content which cannot be further segmented are routed to type-specific classification engines. Type-specific classification engines may include, for example, Text RNN 2015, Video RNN 2020, Image FFNN 2025, and Audio RNN 2030.

Text RNN 2015 uses Doc2Vec to classify sentences, documents, slides, conversations, and other pieces of text. Doc2Vec provides the ability to classify paragraphs and documents. Doc2Vec can also be used to identify similarities between courses composed of similar nodes without having to build an explicit weighting scheme. Doc2Vec is a software application which can take arbitrary content/documents, discover a structure, and assign user-provided labels. Thus, when existing content has been labelled (e.g. content nodes or other content), associations can be formed between existing labelled content and new unlabelled text. This in turn allows for the discovery of new content which is similar in labelling to previously labelled content.

Video RNN 2020 aims to develop the overall context of a video. Course videos may have limited motion, making it redundant to sample continuously. Therefore, in some embodiments one frame is sampled every second to create a series of images. The image frames can then be fed into a RNN (using, for example, a long short-term memory (LSTM) architecture) in order to determine contexts. Audio RNN 2030 uses an RNN as well, but may sample continuously or at a higher frequency than Video RNN 2020.

Image FFNN 2025 uses an FFNN to detect image features and pool those features together.

Course content can be classified collectively or on a piecemeal basis. By using RNNs for sequences, classification can be carried out at different scales. Training of models can also be enhanced by mixing content and sharing labels across media types. For example, classification labels that exist at the course and node levels can also be used to train the classification networks for a variety of different media types.

An example process of training classification networks begins with labelled text training data, as labelled training text may be the most readily available. Text RNN 2015 systems can be trained with text from nodes, for example. As nodes are classified, this may provide an acceptable base for developing a vocabulary model. Additional training may be performed with interactions as feedback mechanisms that act as labels. As an example, conversations can be used for a particular node to discover labels and associate those labels. As another example, bodies of text across multiple nodes can be combined and used to discover higher-level labels and provide loose associations. Once a text model has been trained by Text RNN 2015, other media types can be trained.

For example, video, audio, and generally any sequence RNN training may result in improved accuracy if shorter sequences are trained first. One possible approach is to train against full videos. Another approach is to use lessons in combination with the trained text classifier. This approach may be more computationally intensive, and may also result in more accurate classification.

Figure 21:
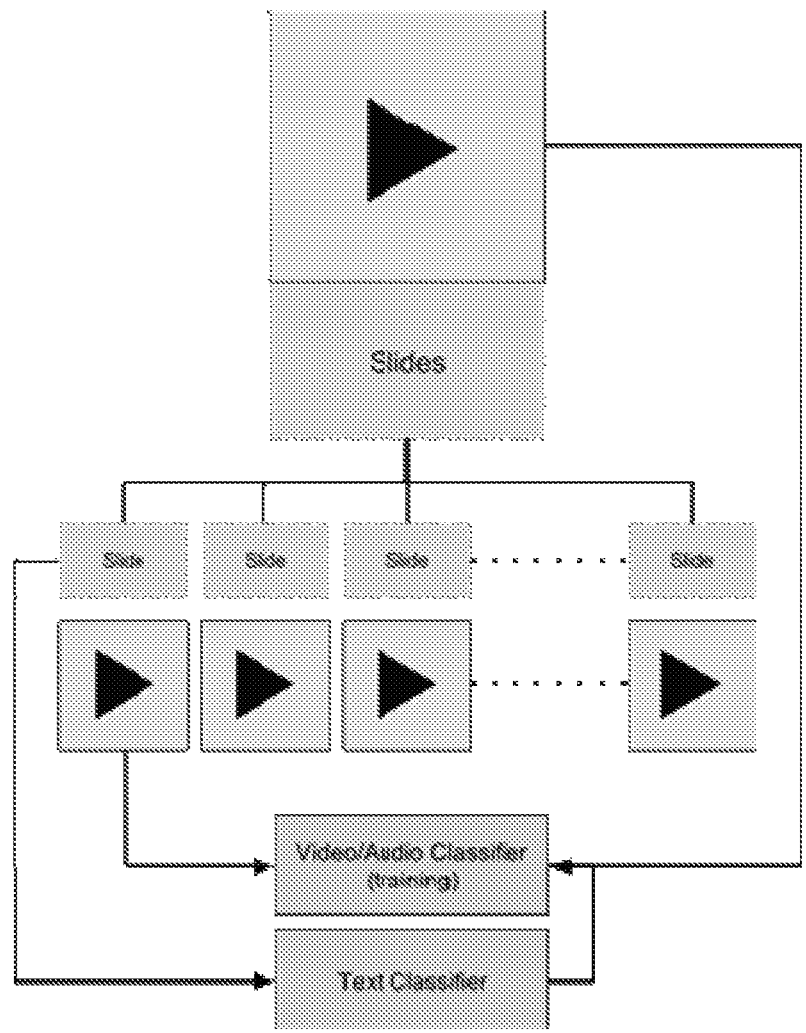
FIG. 21 is a block diagram illustrating an example process for video/audio classification training.

Lessons may comprise video with synchronized slides which provide context for the material being presented in the video. In some cases, the slides act as closed-captioning for the video. By separating a lesson's video into smaller pieces, each associated with a slide, this can allow for sequence training of smaller videos. FIG. 21 is a block diagram illustrating an example process for video/audio classification training. Each slide may also be classified by the Text RNN, and the resulting classification can be used to train the video and audio RNNs. After training shorter sequences, the full videos may also be trained using an overall lesson classification.

In some embodiments, the system 100 can use dynamic content selection for a generalized context. Courses tend to be fairly general, one-size-fits-all entities that remain relatively static. For example, Khan Academy provides questions to students, but these questions do not take changes over time into account. Moreover, programs such as Khan Academy do not project drop offs and building a regularized schedule from the drop offs. Khan Academy also does not use neural networks. However, individual students learn at different paces and have different strengths relative to one another. Thus, it is not ideal to have the same content delivered to every student. It would be desirable for instructors to combine their experience with student performance to provide personal recommendations of content on an individualized basis. Typically, course contents are inflexible and the instructor provides individualized support that is adapted for the student.

Some embodiments attempt to replicate the adaptive support provided by an instructor. In order to replicate the adaptive support, the system 100 should understand the content, student interactions with the content, and the performance of the student. Some embodiments of system 100 track one or more or all of these aforementioned elements, and due to the unique segmented nature of course content, can adaptively create content for individual students.

The system 100 may gain an understanding of the content through use of the classification engines described above. As content is classified at both a macro and micro level view, new content that is similar to previously classified content can be introduced to the student based upon learned behavior.

Interactions between students, instructors and content can also be captured and analyzed by system 100. Interactions can include both immediate and repeat consumption of content, which provides an indication as to whether a student understands the content. Additionally, consumption of content by the same students across different courses can also indicate similarities in interests.

Student performance data can be obtained through assessments which test, at a micro or macro level, the student's understanding, and provide a measurement of the aggregate understanding of content. The results of large and small assessments alike may provide more specific data on comprehension of individual students or groups of students.

In some embodiments, students can indicate the level of proficiency which they desire in a course and receive appropriate support. This differs somewhat from traditional classrooms, where instructors are trying to achieve an average proficiency level amongst a group, rather than attain an individual's target level of understanding.

Combining content, interactions and performance data may also allow the system 100 to understand students in a way similar to an instructor, and may allow for the creation of support material. The architecture of the content generator is general in nature, and, like the traditional role of an instructor, can focus on improving student outcomes.

Predicting Performance

According to another aspect, system 100 may be configured to predict student performance. In order to improve a student's performance, it would be desirable for system 100 to determine or predict how well a student understands a topic. Courses may be broken down into lessons which have questions associated therewith. By combining assessment data along with historical assessment data for a user, the system 100 may provide a prediction as to student performance.

Figure 22:
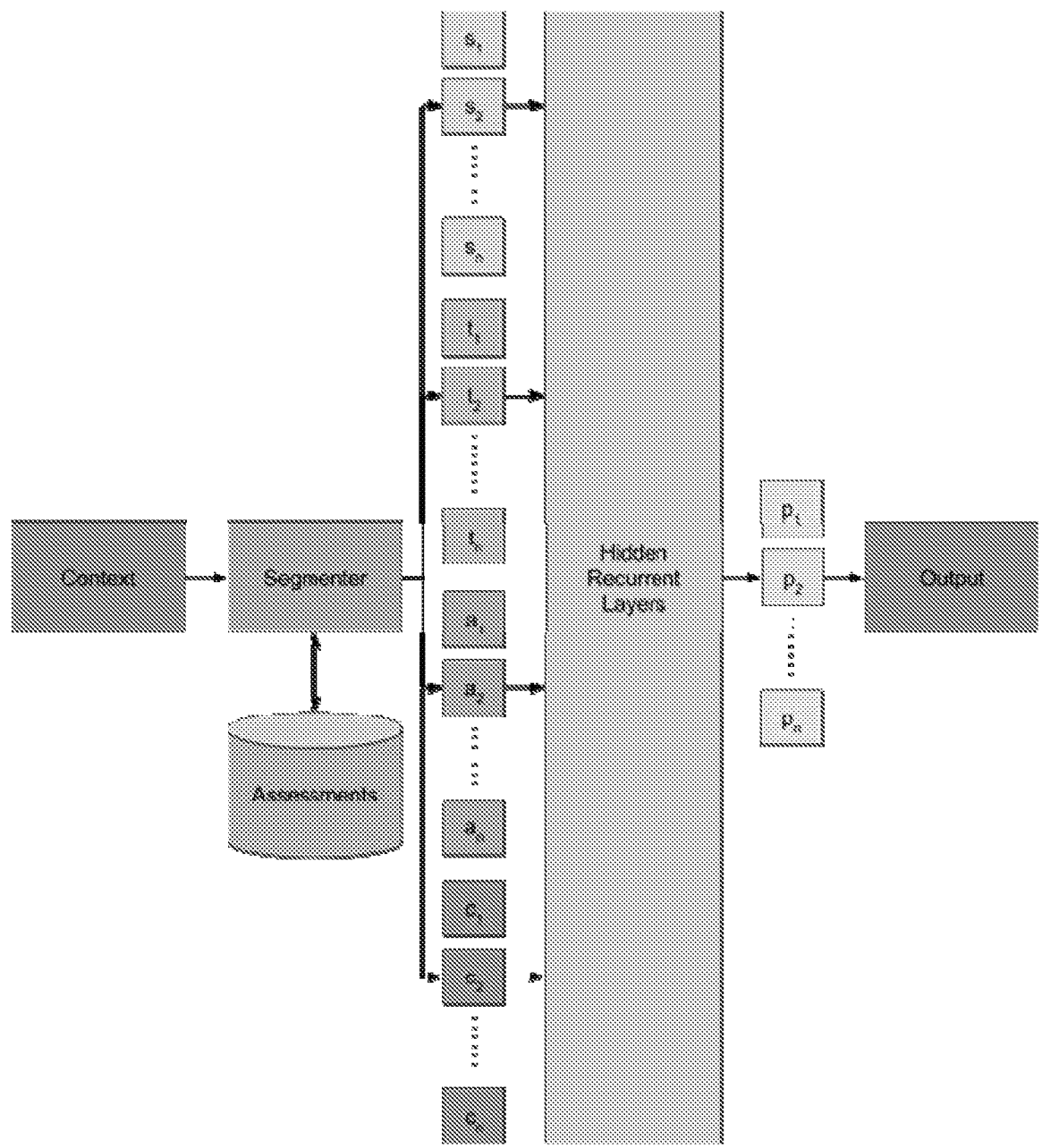
FIG. 22 is a block diagram of an example system for predicting performance.

FIG. 22 is a block diagram of an example system for predicting performance. Starting with an initial context 2205, a segmenter 2210 can generate smaller contexts for which assessment data is obtained from the assessment database. For each new context, all question data may be assembled into several vectors. The first vector $s_n$ may be the time in seconds since question n was asked. The next vector, t, may be the time in seconds that was taken to answer question n the last time it was asked. The next vector, a, may be the number of times question n was asked. The next vector, c, may be the number of times that question n has been answered correctly. The values associated with these vectors can then be passed through, for example, a sigmoid function, and then into one or more hidden recurrent layers 2215. Such hidden layers may include proprietary methods for obtaining probabilities from one or more values associated with the vectors. The final output layer 2220 may output probabilities as to whether a given question will be answered correctly. Since the performance prediction system is an RNN, it may be appropriate for handling sets of assessments over time.

The example performance prediction system can take content activity into account by including additional input vectors for time elapsed since lesson consumption, the number of times a lesson has been consumed, as well as the total number of seconds of a lesson that has been watched. These additional vectors may result in larger input vectors and an increased number of nodes in the hidden layers, but may provide more accurate results. The number of values in the input vectors may also depend upon the scope of the context. Performance prediction can focus on a single lesson, a course, multiple courses, or any combination thereof.

At any size level, the performance prediction system can be trained and the output predictions can be used to create assessments. The results of an assessment can then be used to train the question predictor, which results in further refinement and reinforcement of models with more data. Such a training methodology can allow the system to begin training with short sequences and then build to longer sequences that may improve longer term accuracy. The example performance prediction system may form the basis of a dynamic support and content generation platform. By modifying the input context and output systems, a variety of specific use networks can be created which leverage a common core.

In some embodiments, there is provided a study preparation tool for creating study plans which further comprise study sessions. Study sessions may contain content and/or questions. Using the network and content structures described herein, a study plan or schedule can be created to improve or even maximize proficiency ahead of a target date (e.g. the date of an evaluation). For example, each day (or other time interval which can be configured flexibly), the student is presented with content to help improve the student's understanding of material, and then the student is tested on the material. Some embodiments of the systems described herein are configured to project what the student should learn in each time interval. For example, ahead of a final exam (e.g. 1 hour before the final exam), the student may work through questions as a final refresher to enhance the student's preparedness and familiarity with the material upcoming on the final exam.

In some embodiments, a student can customize a study plan by selecting which concepts will be on an exam. Study plans may use the content pool/graph and draw aggregate performance data from the performance of the study plan.

In some embodiments, the student preparation tool may also tailor the practice plan to detect or anticipate the level of exhaustion of a student (for example, if the student's proficiency begins declining during long practice sessions). Future practice plans may take into account the amount of time required for the student to reach exhaustion in given subject areas with given question types, and future practice plans may be configured to avoid exhausting the student.

Assessment Creation

According to another aspect, the system 100 can create assessments. Assessments are used to determine the overall understanding that a student has of a particular piece or pieces of content. In order to assess understanding, the student can be asked any number of questions. In some embodiments, the student is asked the questions which are least likely to be answered correctly. By using the base network and filtering the output, assessments can focus on areas perceived to be weak. Such a process may also improve the accuracy of predictions generated, as the results of the assessment can be used for further training of models.

An example process for assessment creation begins with the input context, the minimum proficiency desired by the student, and the number of questions that should be asked. The assessment creator can then segment the input context until the appropriate level of questions and/or concepts is reached to attain the proficiency desired by the student. For each lesson, the assessment history is retrieved and the values are fed into the performance prediction system. After the last question is sent to the performance prediction system, the output from all of the lesson predictors are merged. The merged set may comprise all questions with proficiency values equal to or less than the minimum proficiency desired. If the number of remaining questions is smaller than the number of questions that should be asked, then questions are randomly added until the target number is reached. If the remaining set of questions is larger than the number of questions that should be asked, then the questions with the highest proficiency are removed until the target number of questions is reached.

The aforementioned process may also allow questions to be generated in real time. The generation of questions in real time is desirable due to varying rates of decay. Unlike traditional learning models that use fixed or exponential rates of decay, the prediction system has varying rates of decay. The decay rates may depend upon behavior, as well as the particular lesson. As such, system 100 may be able to accurately assess the immediate proficiency of a student. Additionally, future proficiency can also be predicted by modifying the values associated with the "time since asked" input vectors for the predictor.

In addition to quizzes and exams being generated dynamically to be as difficult as possible, system 100 offers other uses. For example, pop quizzes can be generated from many different courses which challenge the student with a variety of content. A large number of tests can be presented to a student where questions are asked continuously until the student answers a predetermined number of questions incorrectly, or until the student decides to stop.

Figure 23:
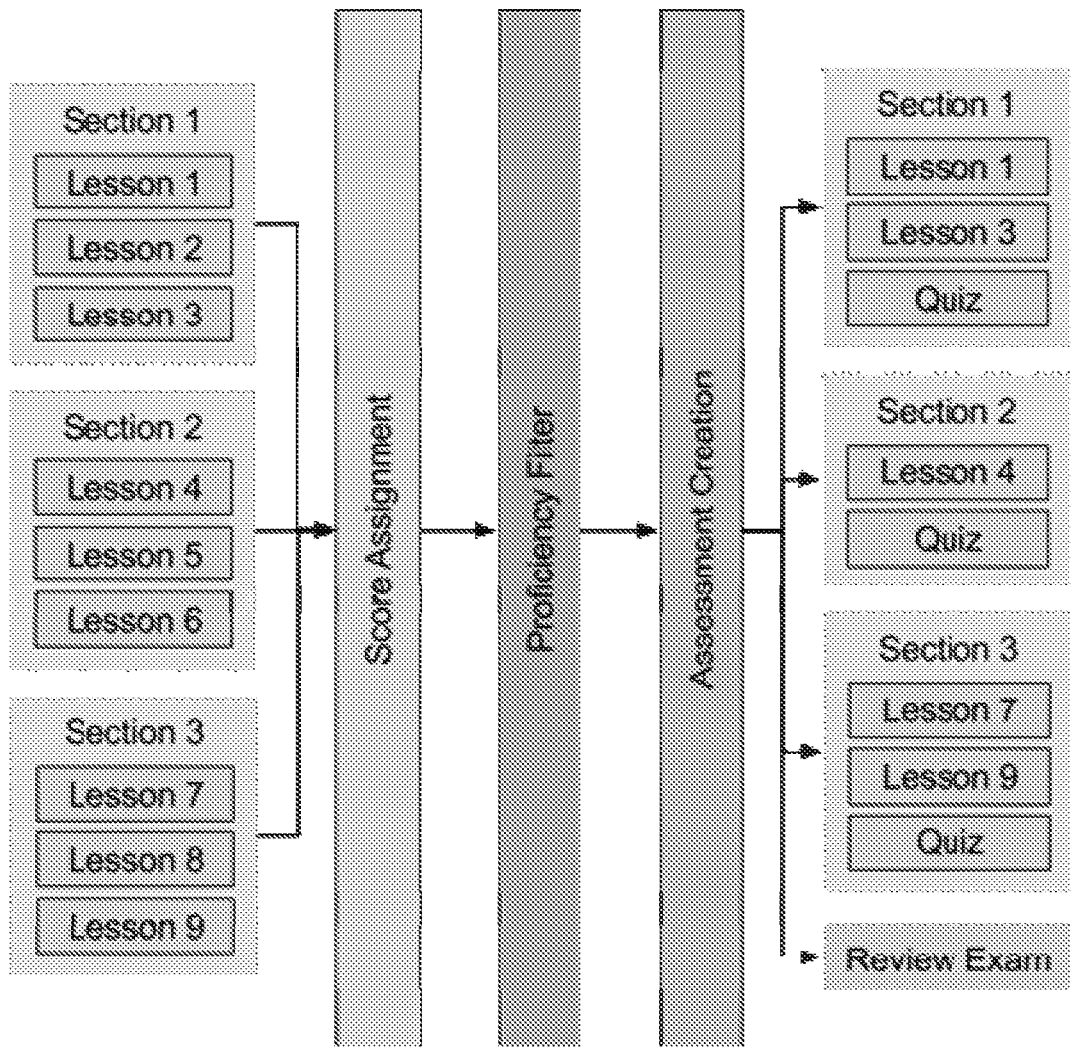
FIG. 23 is a block diagram illustrating an example review course creation process.

Some embodiments may also generate review courses. FIG. 23 is a block diagram illustrating an example review course creation process. While assessments may be useful in identifying areas of weakness for a student or group of students, content is also required so that a student can learn or review and improve their proficiency. Dynamically creating review courses may create an opportunity for a student to focus on lessons that they need the most. Similar to assessments, review courses can be generated in real-time and can have varying content over time.

The content in a course comprises lessons 2305 which have a relationship with the prediction engine. By taking the average proficiency value for all questions in a lesson, a proficiency score for the lesson can be generated. The lessons can then be filtered to remove lessons which are above a desired proficiency level. The remaining lessons can then be organized into their original sections with review quizzes at the end of each section, as well as a review exam at the end of the course.

Outcome Prediction

Predictive assessments and review courses described above may be aimed at providing just-in-time solutions that address a student's immediate needs. Instructors use their experience, student behavior, and current proficiency to project outcomes and intervene in advance. Outcome prediction is the basis for early intervention features that may provide additional support for students.

Figure 24:
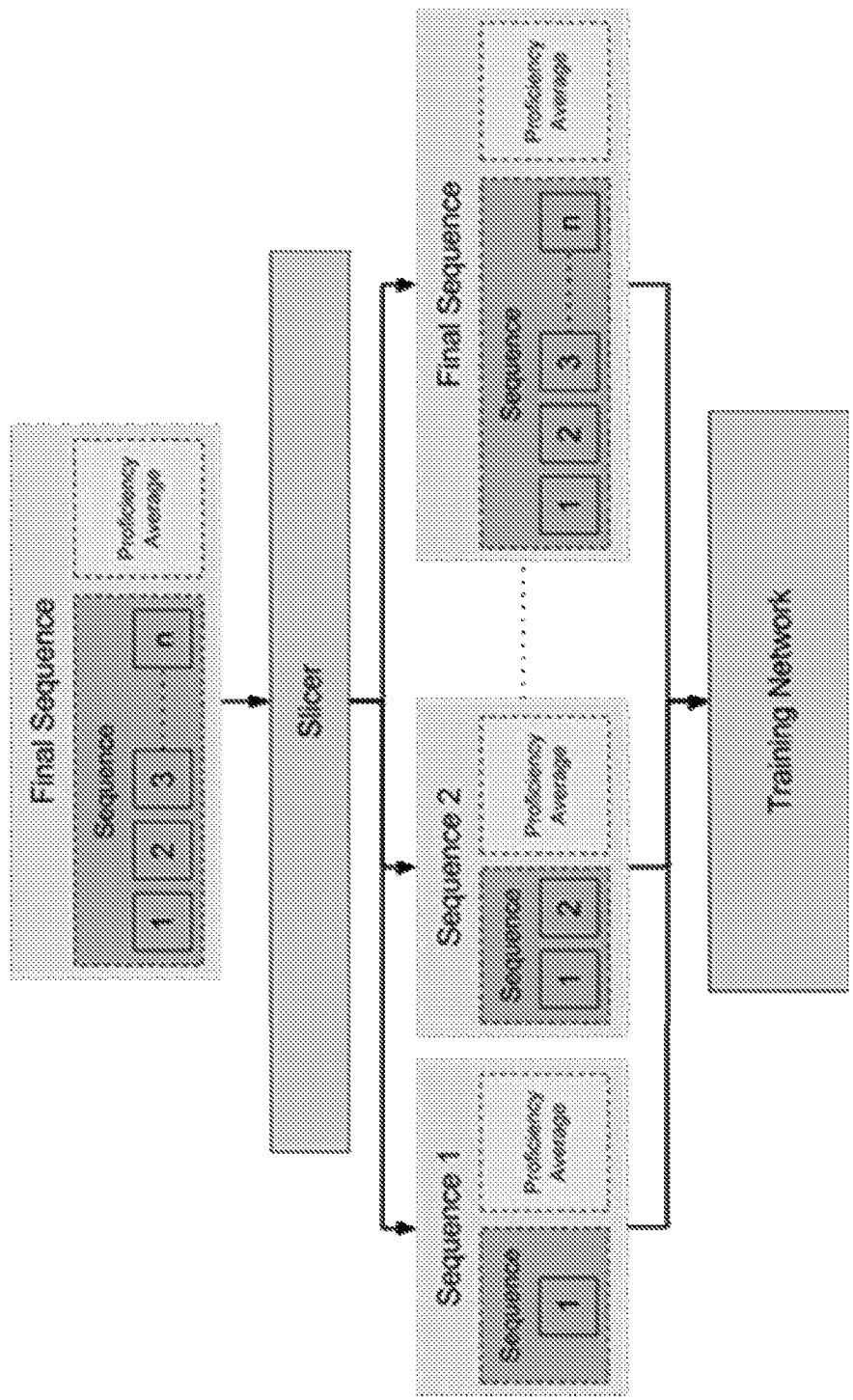
FIG. 24 is a block diagram of an example process for training a neural network for improved accuracy.

According to another aspect, the system 100 uses an RNN with inputs of behavioral and proficiency vectors to project a student's proficiency. FIG. 24 is a block diagram of an example process for training a neural network for improved accuracy. The output proficiency vector from the RNN corresponds to a range of values rather than a single proficiency value, since final proficiency can be a range of values with a minimum and a maximum expected outcome. As more content is considered, the range of possible outcomes is narrowed and the confidence associated with a particular outcome may increase.

The output vector can be viewed as a set of categories ranging from 0% to 100% proficiency. Category buckets need not be of equal sizes, since the problem is one of categorization and probability of categorization. Since precision is more important at higher grade levels, the category buckets can be sized appropriately.

Training may be performed by using long sequences where the proficiency average for the full course is available. Many short sequences may be created from each long sequence, showing the progressive path that was taken. This is shown in FIG. 24. With each sequence, the network is trained along with the final proficiency average. This may result in a network which is able to predict outcomes starting with short sequences and improving in accuracy as longer sequences are introduced.

Competition

Learning and support mechanisms may improve a student's proficiency in a given subject, but lack comparative features. Whether in school admissions, marks, or the job market, students are in constant competition with one another. Many institutions also curve grade distributions. It is important for students to be aware of their proficiency relative to other students if they wish to stand out relative to other students.

In some embodiments, students may compete passively. Passive competition involves a comparison between students. Comparing proficiency and projections is a non-public type of competition. Students can see direct performance compared to that of other students, both at their school and at other schools. When projections are taken into account, students can ascertain whether they are going to meet their goals.

Comparisons show proficiency and points rankings for particular content contexts, such as a particular course. Additional metrics which may be displayed include time spent on the context, the number of consumptions, and the number of questions answered. These metrics may allow a student to determine how much energy they should invest into the content to improve their overall standing.

Students can also compare their current performance to their past performance. The student's various performance metrics can be compared in terms of proficiency and points with similar time segments (e.g. day, week, month), showing totals within a course as well as across multiple or all courses. This may provide the student with a form of self-motivation that is rewarded with badges which may optionally be visible only to the student. A target point level can also be set with the system using notifications to engage the student to return and hit their targets on a daily or other basis.

In some embodiments, students may compete actively. Active competition may drive students to maximize specific objections within a small time frame with a reward or award. Active competitions publicly reward competitors for their achievements. Individuals and groups compete against each other to maximize an outcome within a set period of time, or in some cases require that a student or group be the first to reach a predetermined state. Winners are rewarded publicly with trophies, badges, virtual goods, or prizes with monetary value.

In some embodiments, competitions are bounded geographically, as well as limited to specific subject areas. This allows competitors to focus on particular subjects. This may also increase the intensity of competition as students achieve greater levels of proficiency in targeted subjects.

Competitions can be classified into various types and allow additional engagement mechanisms and unique opportunities. Each type of competition may have its own rules and scoring that focus on a core engagement mechanism.

One example of a competition is an individual competition. In an individual competition, each entrant competes against all other entrants. These competitions attempt to crown a champion and provide an overall comparison ranking those that participate. A competition is created by a user and is then visible to all other members qualified to join. The creating user may also specify the maximum number of participants, any entry fee, the length of the competition, and the content to which the competition is limited.

After a competition has begun, participants may have a set period of time to maximize their points. All content consumed during a competition may count as newly gained points towards the competition such that consuming a previously consumed video or test counts as new points within the scope of the competition. The winner may win, for example, all of the entry fees collected from the entrants. There may also be prizes for coming in $2^{nd}$ place, $3^{rd}$ place, or the like.

Another example of a competition is a Group vs. Group competition. These involve large collectives of users competing against one another. During the competition period, activity by users in each group may count towards the score of the school. The overall score may be calculated using adjusted points scoring in an attempt to allow smaller groups to compete more effectively.

In some embodiments, group competitions may be created by the system 100. Users may be notified when a group competition is on offer, and also when the competition has ended. The prizes for winners of group competitions may be predefined, and may include trophies shared amongst members of the winning group.

In some embodiments, points for group competitions may be calculated on an adjusted basis. For example, the average amount of points scored per group member may be calculated, rather than the total amount of points scored by the group. This allows for groups with different numbers of participants to compete fairly. An example algorithm for computing a adjusted score is as follows:

Let g be a group and G the set of k groups that are competing with each other.

$$G=\{g_1, g_2, \ldots, g_k\}$$

Each group is a set that contains the points, p, attained by a member, of which there are m, during competition:

$$g=\{p_1, p_2, \ldots, p_m\}$$

Let σ be the standard deviation of all of the points attained amongst all of the groups. Let T be the number of total participants:

$$T = \sum_{g \in G} |g|$$

Let S be the average number of points across all groups:

$$S = \frac{\sum_{g \in G} \sum_{p \in g} p}{T}$$

Let A(g) be the adjusted score of each group and includes a performance bonus. The performance bonus is given to each group for each student that performs above one σ of the total mean. Let C(g) define the group of points that should receive the bonus.

$$C(g) = \{p \mid p \in g \wedge p > \bar{g} + \sigma\}$$

With that set we can now calculate the full adjusted score:

$$A(g) = (T - |g|)\min(\bar{g}, S) + (|g| + \log_{10}(|C(g)|))\bar{g}$$

During competitions, it is crucial to ensure that participants are unable to cheat, so as to ensure a fair outcome. Some embodiments provide a cheat detection system which uses behavioral data to determine if a participant's activities warrant further attention. This detection system may also be used for assessments within learning systems, outside of competitions.

A cheat detection system is based on many assumptions. It is assumed that cheaters are attempting to maximize points by answering questions quickly and correctly so as to maximize bonus points. In order to detect possible cheating, three interquartile comparisons may be performed to identify outliers. The first is performed for each question and compares how long it took to answer a question for each student. All times are collected and outliers may be highlighted. A second test measures the time taken to complete an assessment or contest and to also look for outliers. The first and second tests highlight behaviors which are suspect. The third test checks completion times for the suspected users with all of their other entries/competitions. The third check determines whether an entrant suddenly started performing significantly better than their baseline statistics.

These checks may also flag high-performing students or those that have made significant improvements through their understanding of the material. Automated systems may also create results that ramp up over time that avoid detection by simple systems.

In some embodiments, when the answer to a question is selected, the coordinates on screen that were pressed can be captured and analyzed. Answers that are similar in positions on screen would typically be touched in a similar manner by the same student, which can allow analysis across unrelated screens. Coordinates for a given student can be compared against other students, and outliers can be highlighted as suspicious when combined with other analysis methods.

Another method for catching cheaters is by confirming the identity of the participant. For example, visual confirmation may be used. Most modern computing devices have front-facing cameras that can take photos and record video. Competitions and assessments may require photos to be transmitted along with answers. The student can also be asked to show identification that is stored with their personal data. In some embodiments, facial recognition may also be used to highlight students that may be receiving assistance from others along with a photo, video, and audio audit trail. The trail may not be continuous, and pictures and audio may be collected periodically throughout an assessment to preserve bandwidth and battery life for the computing device 110.

In some embodiments, cheat detection is automated. A FFNN can be used with an input vector that combines correctness, timing, coordinates, distances from the mean, and image similarity values. The FFNN may be trained against known cheating behavior with a 0 indicating non-cheating behavior and a 1 indicating cheating behavior. When run against live data, the FFNN may provide a probability that a student is cheating, which can be further examined should a particular result be highlighted.

It should be appreciated that although various examples are described in connection with computing device 110 and server 102, various other configurations are possible. For example, distributed computing systems may be used to off-load data analytics and provide faster performance from system components which are required to provide responsive performance to students during content consumption.

Moreover, as new content is added to the content pool, increasing the number of processing networks may improve the speed of processing. New content should be processed and classified continuously with existing classified content. New content may come in many forms, including general web content including videos. RNNs may be able to relate videos to text, as well as to other content within the content pool. Combining basic classifications with student interactions may also provide neural networks with an opportunity to learn field-specific nuances. For example, two videos that may be very similar but contain different examples can be presented depending on the course context.

Context may be important for neural networks to gain understanding, due to the content construction system. Content is pulled from the content pool to create courses, which means that a single lesson may be found in many different courses or in a subset of large courses. Since prediction data may already exist for lessons in a new course, predictions may be able to be made immediately on outcomes. Such predictions may be useful when creating preparatory courses for high school students with elements from higher education courses. Students may also be shown how they would perform at higher levels with their current understanding of material and which areas require improvement.

Proactive students are generally more likely to achieve proficiency and maintain proficiency with periodic assessments. These proactive students may in turn provide peer support more often than students who are not proficient. Proactive students may also exhibit a plurality of behavioral traits which can be measured and analyzed. The system 100 may connect students with particular traits with individuals, companies, and higher education institutions that have a demand for students with those traits.

Some embodiments of the systems and methods disclosed herein may also help students who are not yet proficient or are facing a decline in proficiency. Since the system can project proficiency into the future, interventions can be scheduled to target specific areas for which a decline in proficiency has been predicted. A schedule can be combined with proficiency requirements for a target data, an exam or interview, so as to allow for progressive improvement. By creating a study plan, peer assistance can also be scheduled in advance, rather than on demand. This proactive approach may provide peer experts with more certainty in their schedule and allow them to prepare in advance for their sessions.

Moreover, for subjects where peer assistance or content is not immediately available, students can also construct courses dynamically. By providing instructions to the platform, courses can be created and then refined progressively. By combining instructions along with student activity, profile and demographic data, the system can take internal and external content to address specific needs.

Example Screenshots

An example application for execution on computing device 110 will now be described with reference to various example screenshots.

Figure 25:
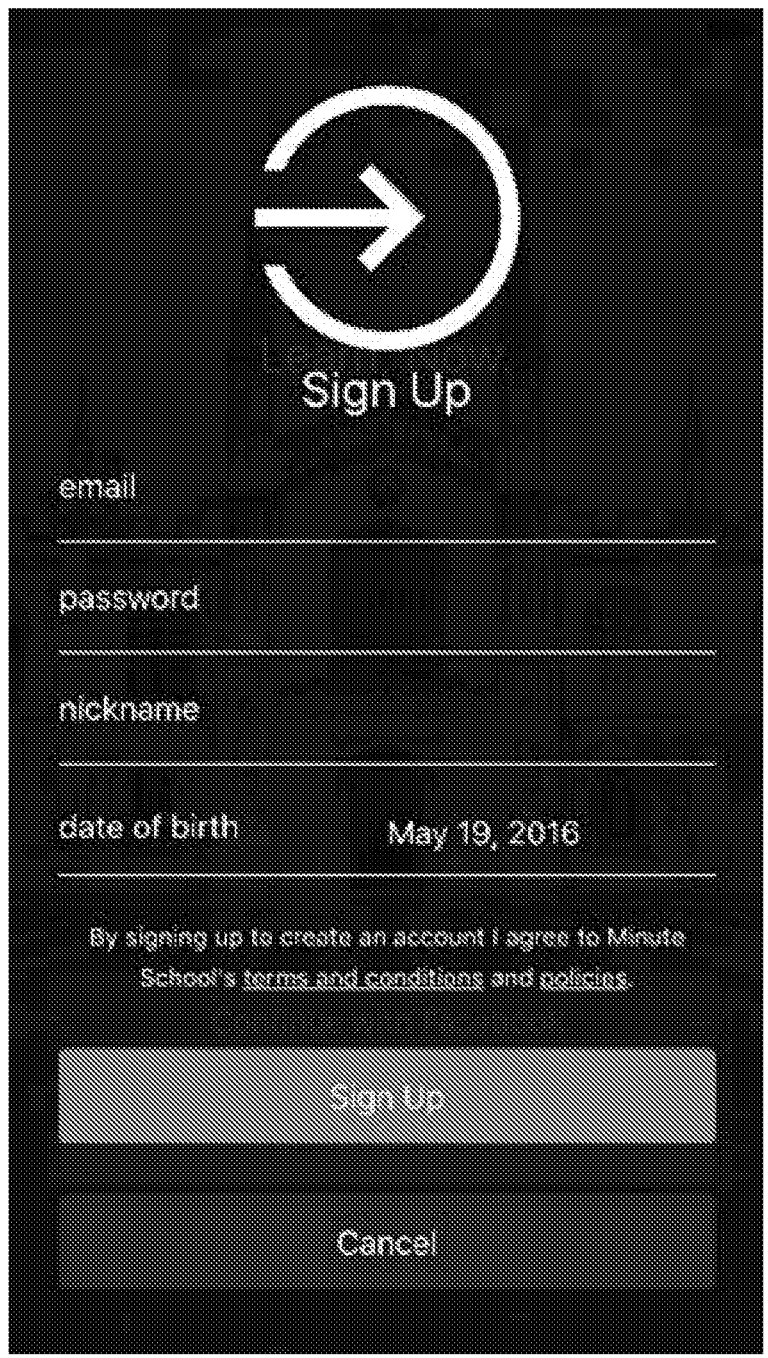

FIG. 25 is an example sign-up screen which collects primary data. The user's date of birth may also be used to group and classify the student.

Figure 26:
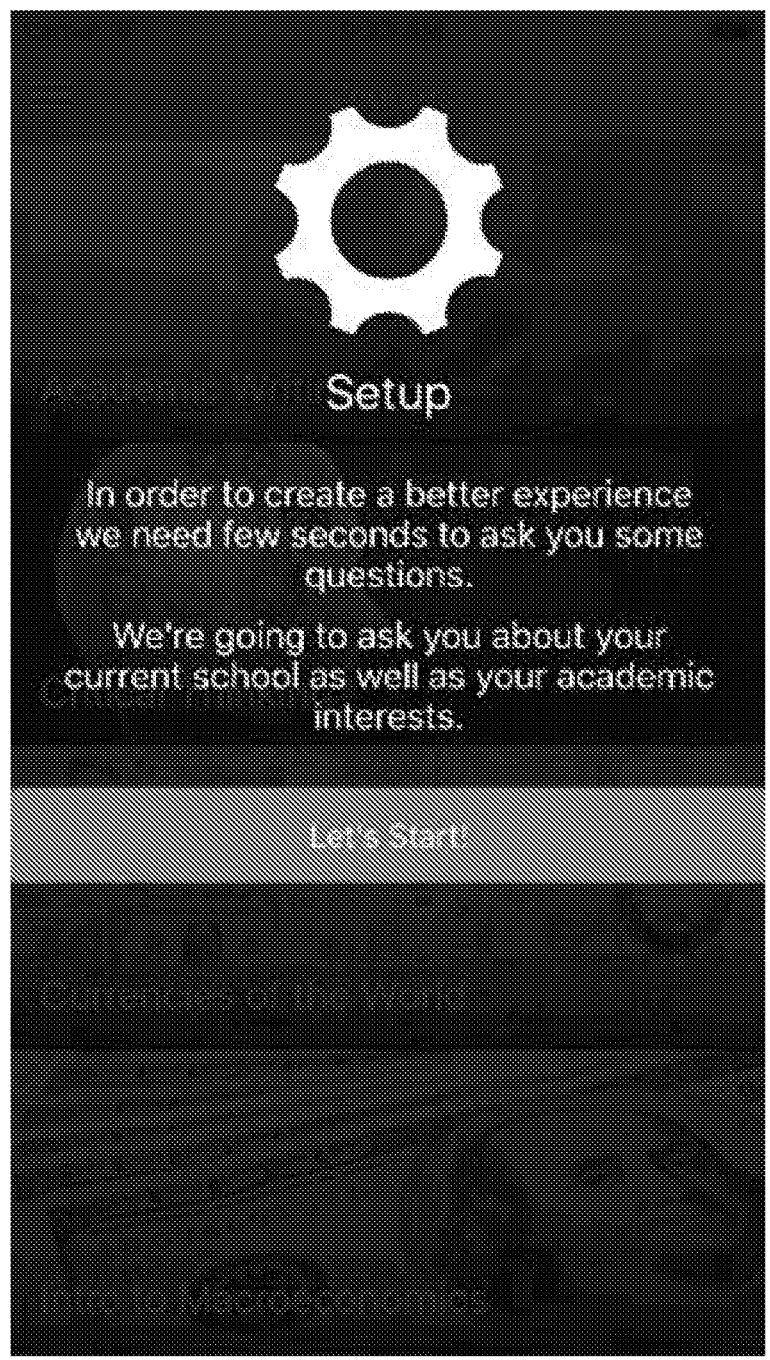

FIG. 26 is an example setup process screen, which collects information to place students into a localized environment and collects data regarding interests.

Figure 27:
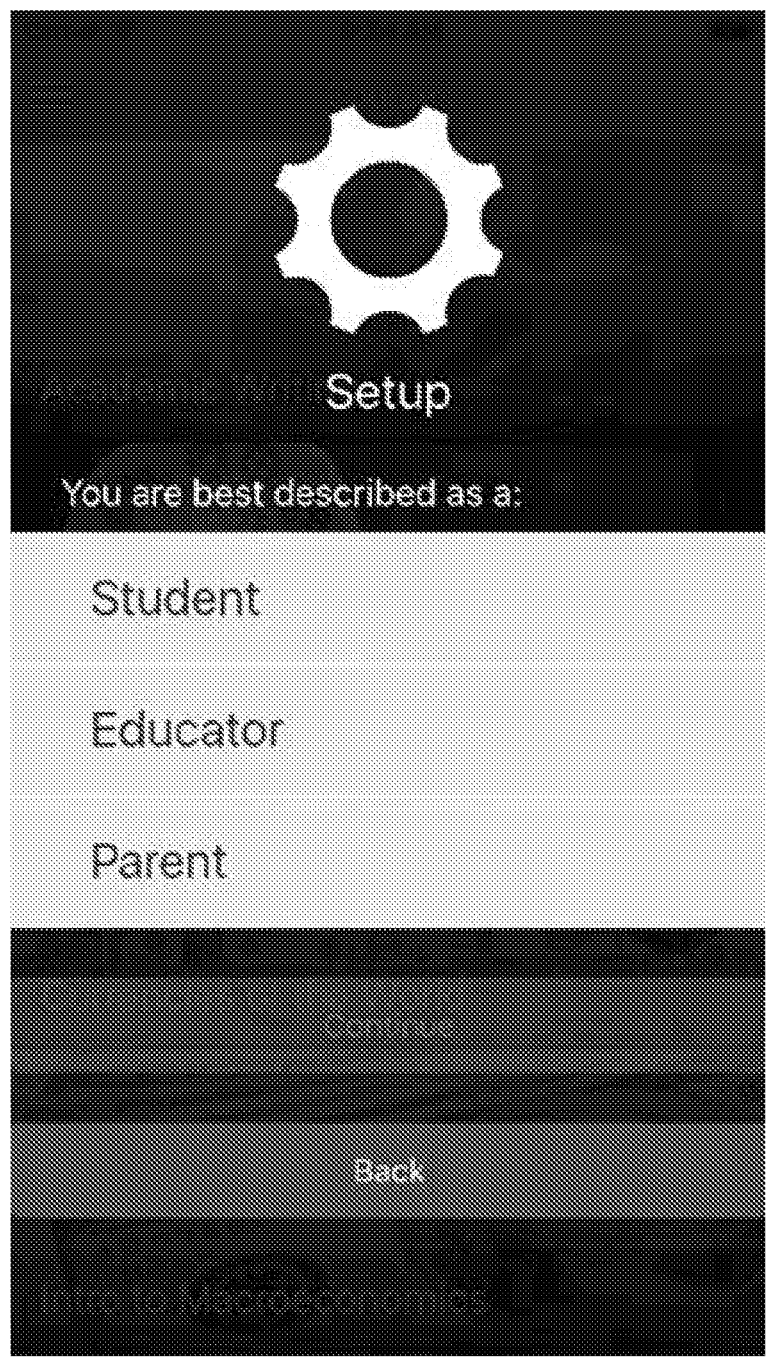

FIG. 27 is an example screen prompting a user to classify themselves as a student, educator, or parent. Such a classification of member type may allow neural networks to weigh similar types of users together.

Figure 28:
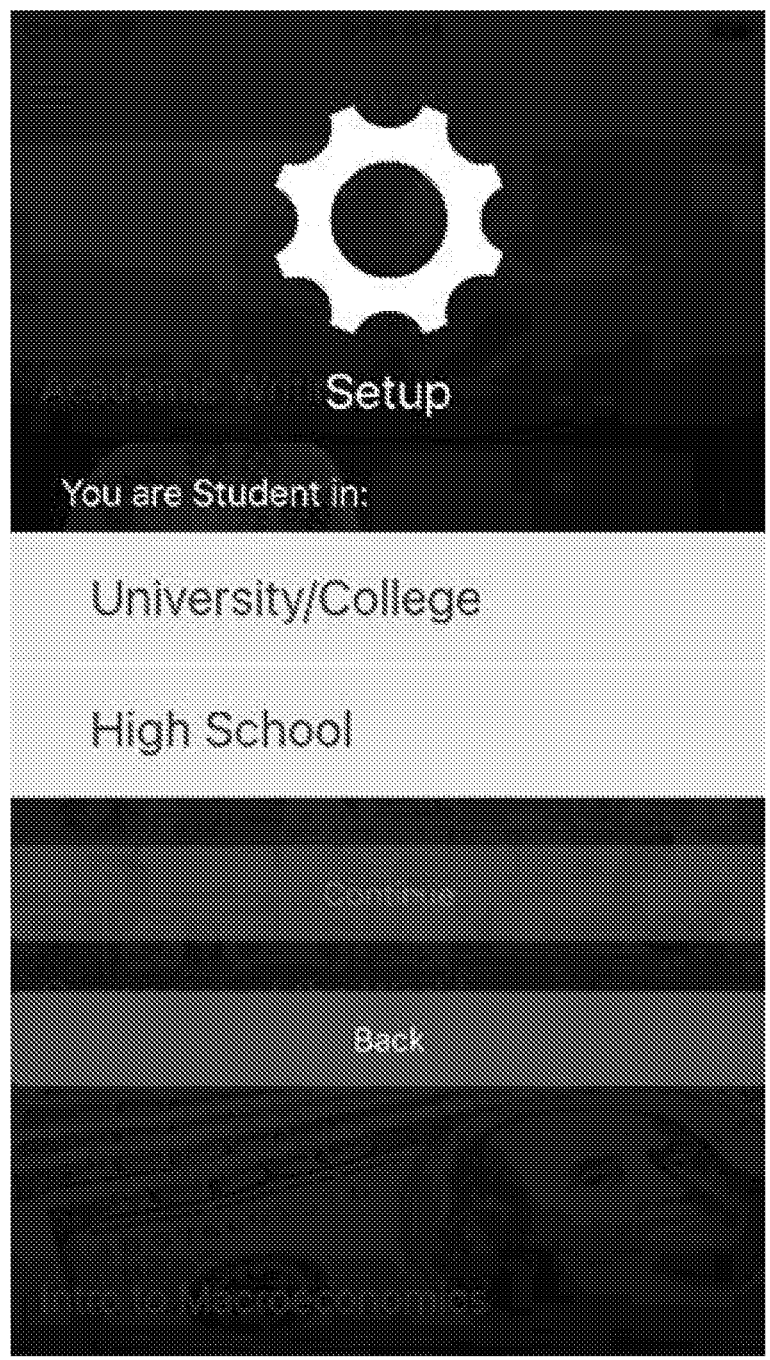

FIG. 28 is an example screen prompting a student user to provide their current education level. Although University/College and High School are listed, other levels of education are contemplated. Determining the user's current education level may provide further grouping data for neural networks, and can be used for projection with similar behaviors should the education level subsequently change.

Figure 29:
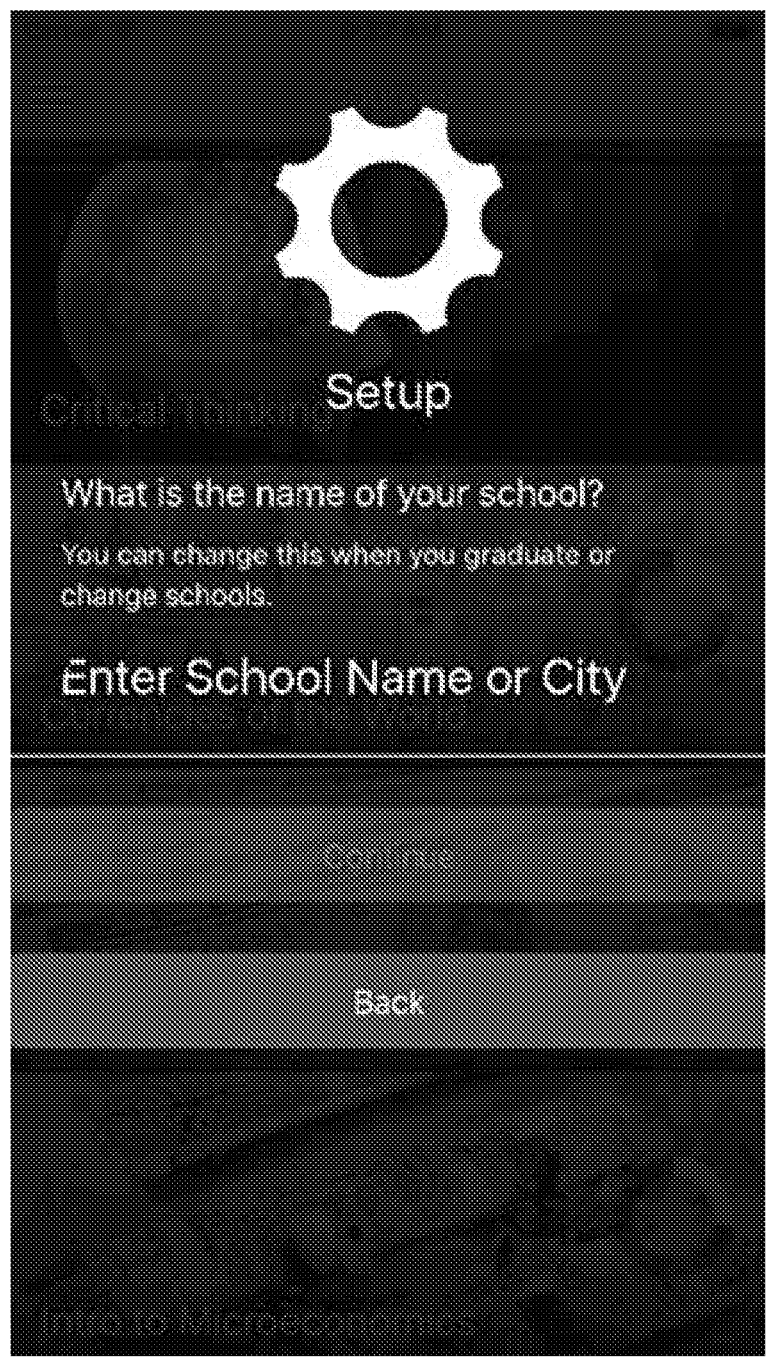

FIG. 29 is an example screen prompting the user to enter their school name or their city. This allows the system to localize a user to a school and to other students and schools in the same geographic area. If a student changes schools, this value can be updated while keeping a historical record of previous schools. This data can further be used to tag activity at a particular time of day at particular schools. This may allow the system to better understand students that share a common background and tailor content to them.

Figure 30:
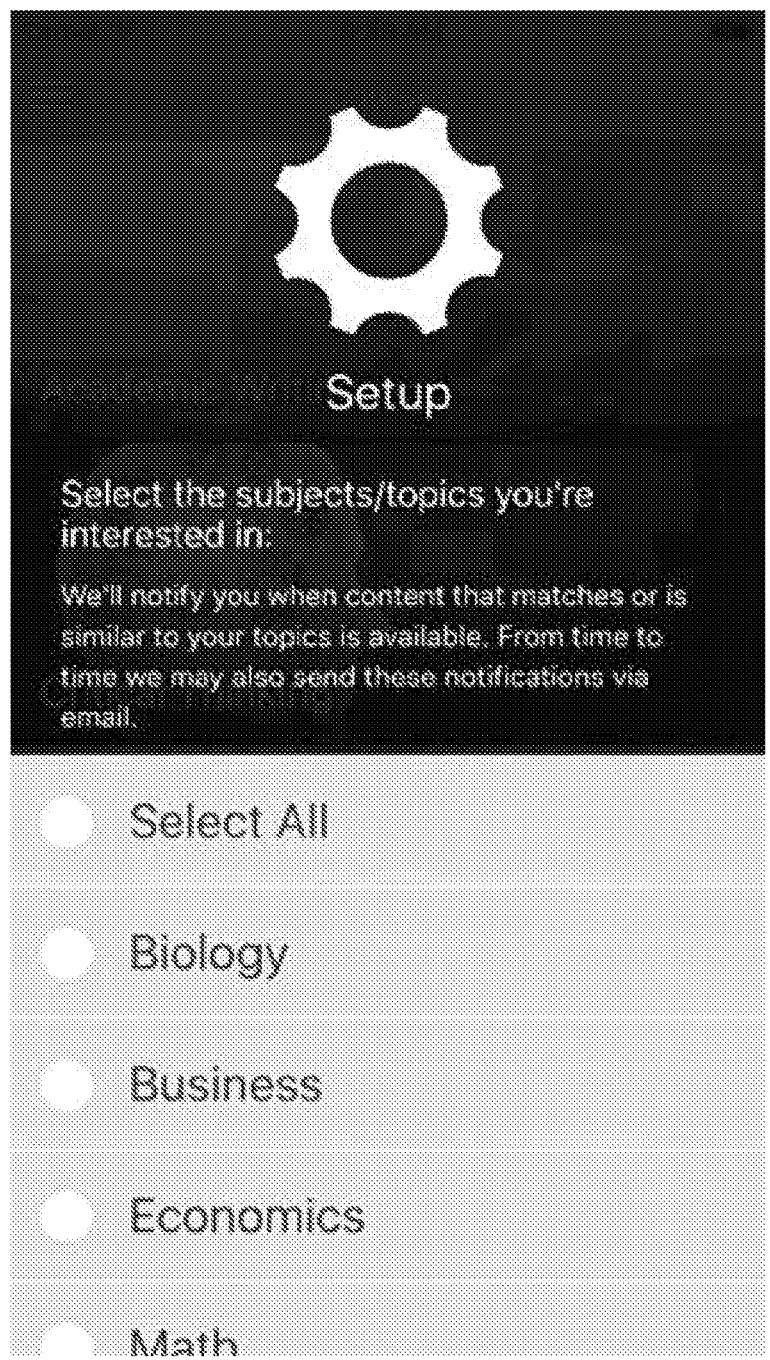

FIG. 30 is an example screen prompting the user to select topics of interest. This may be useful in allowing the system to make recommendations regarding relevant content while also building a profile for the student and their interests.

Figure 31:

FIG. 31 is an example screen displaying a course list to the student. The system may collect data regarding which courses are selected, which courses are viewed, and which courses are not viewed by the student.

Figure 32:
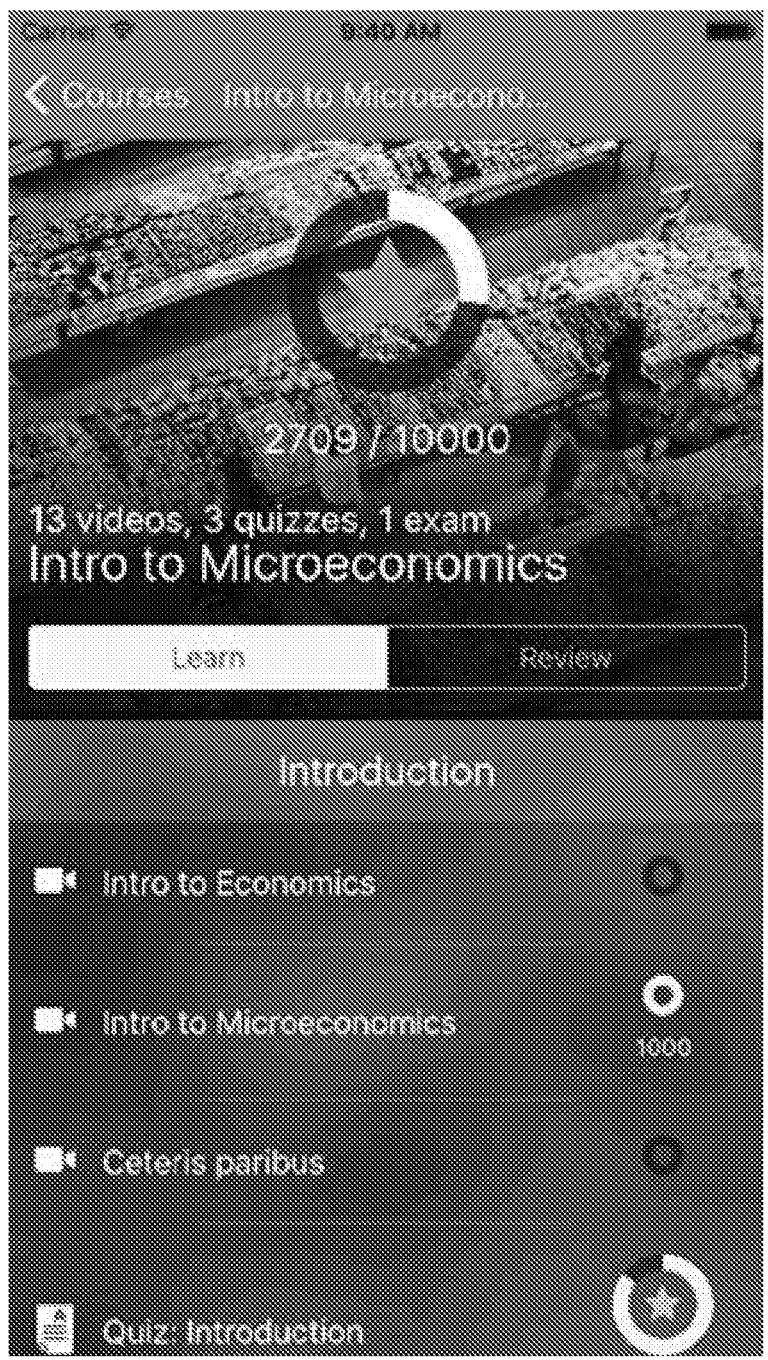

FIG. 32 is an example screen displaying a course description. The screen may show progress status, sections, lessons, assessments, and other nodes. Points and achievements may also be shown in this area. In some embodiments, all activity surrounding these nodes is gathered by system 100 for analytics purposes. This includes selections to view content, share or not share content, and starting content consumption. All such actions may be timestamped.

FIG. 33 is an example screen showing a still image from a video with the corresponding slide shown below the video. Start and end times for lessons may be recorded.

Figure 34:
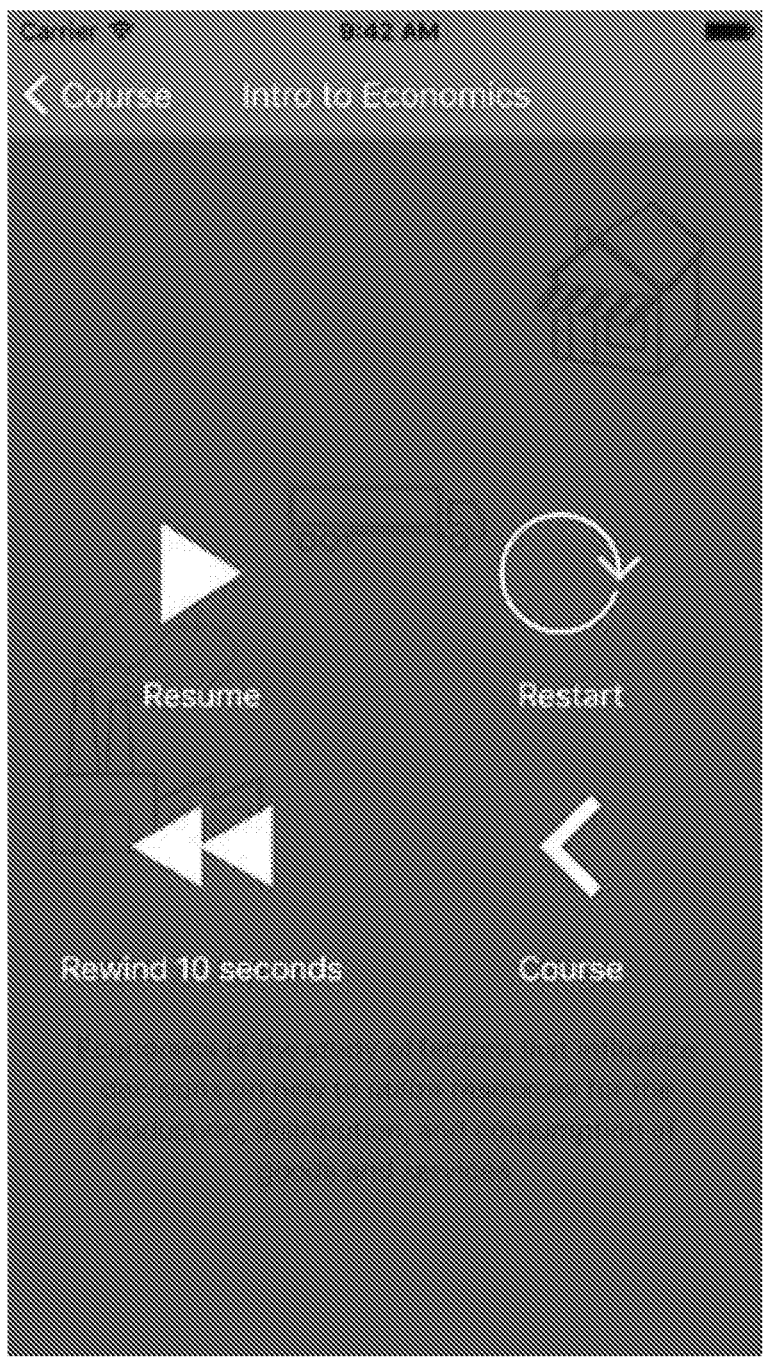

FIG. 34 is an example screen that may be displayed with a video is paused. Interactions with any or all buttons on the screen may be recorded, as well as the fact that a pause action was initiated by the user.

Figure 35:
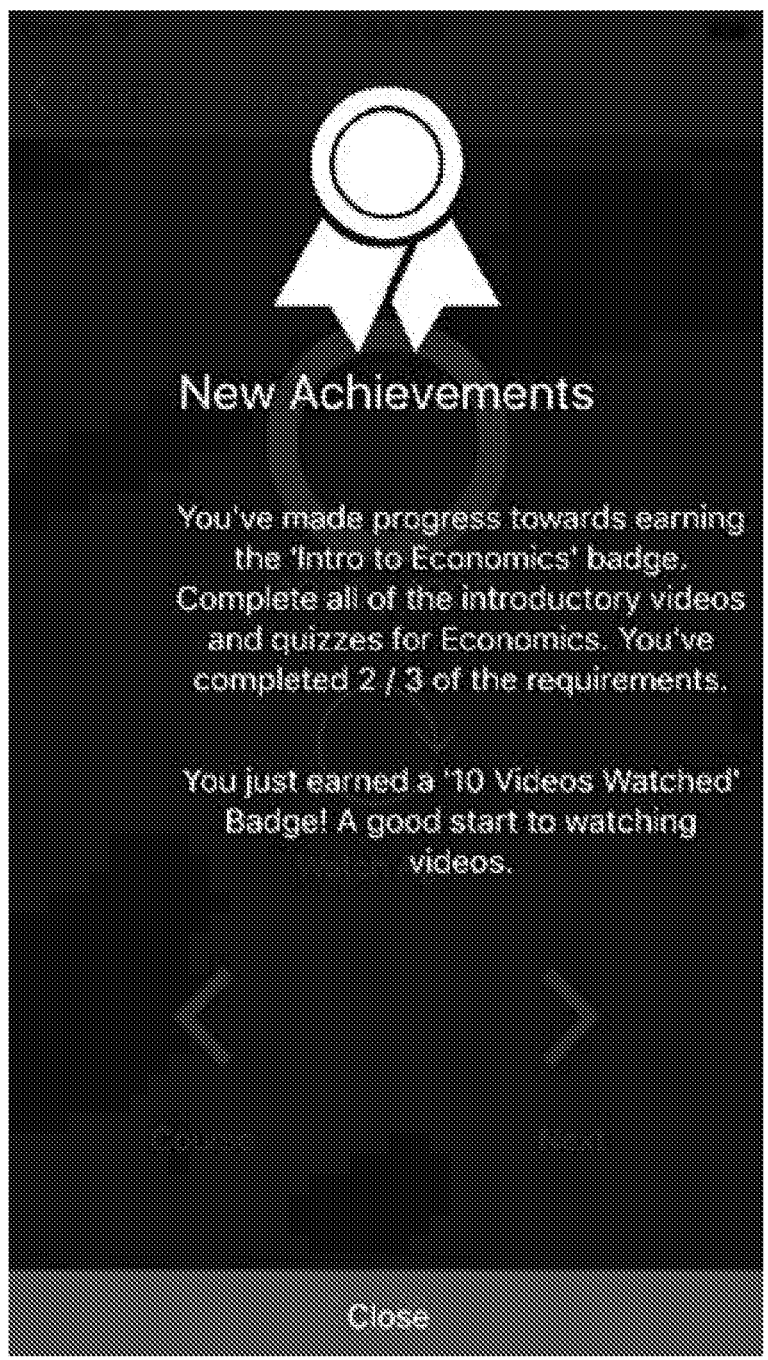

FIG. 35 is an example screen that may be displayed when a user receives an achievement. Such a screen may provide a description of the achievement to the student, as well as why the achievement is being awarded.

Figure 36:
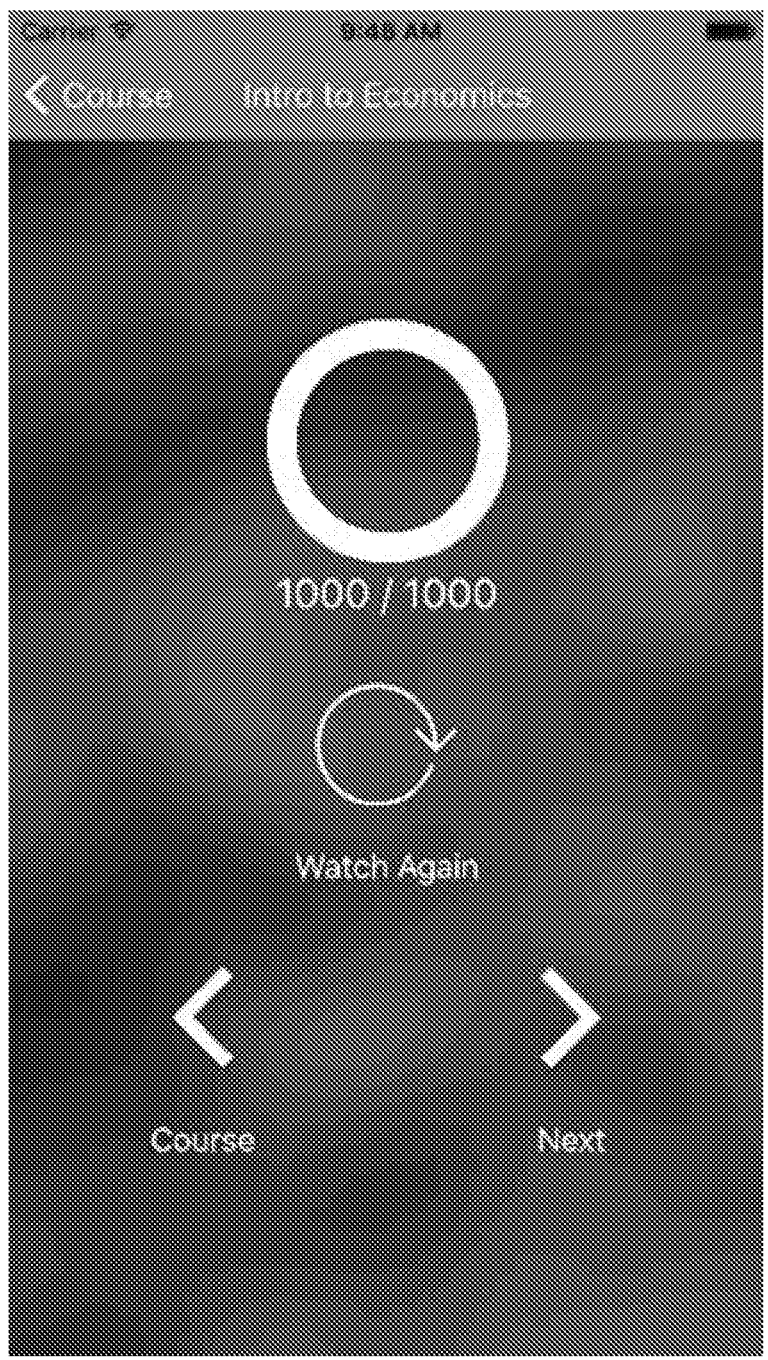

FIG. 36 is an example screen that may be displayed upon completion of a lesson. The screen may list the amount of points that were earned by virtue of the completion. Various buttons may be displayed and any actions from the user may be recorded.

Figure 37:
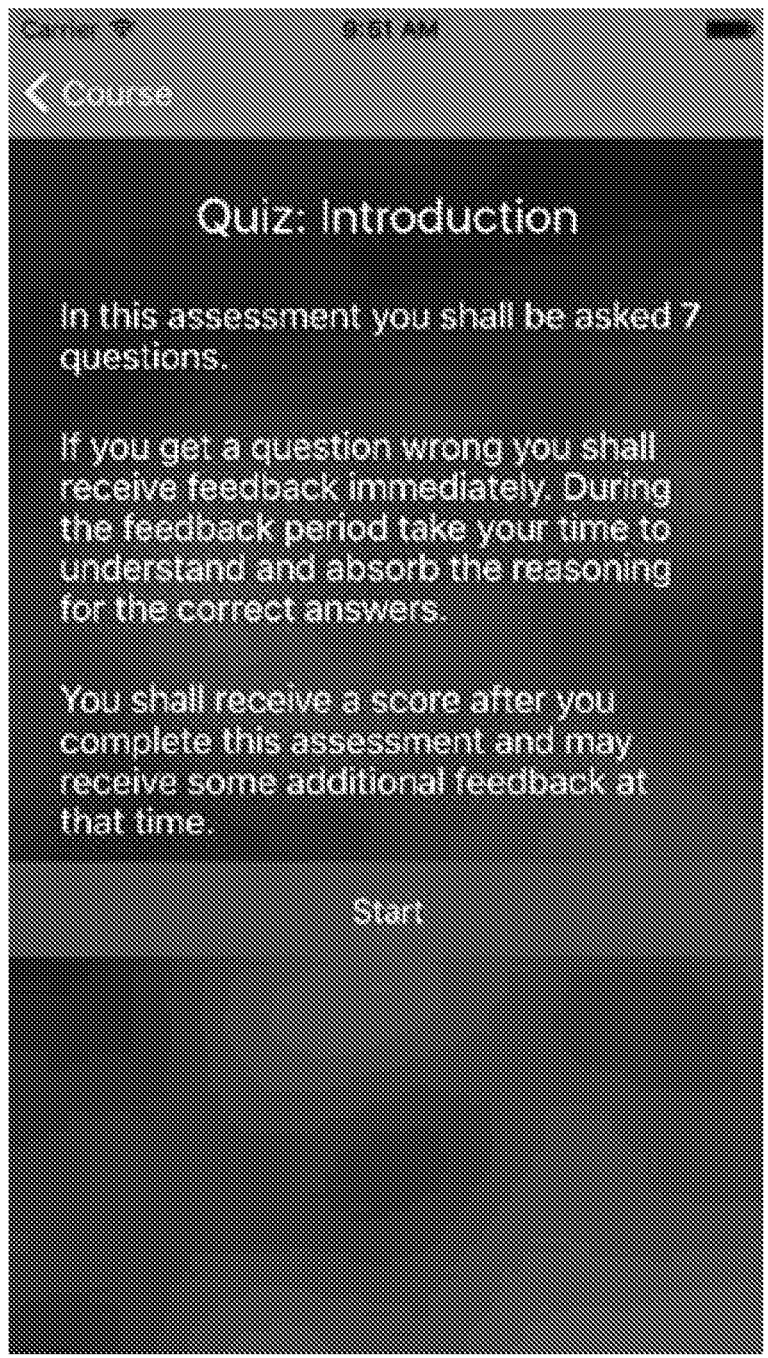

FIG. 37 is an example screen that may displayed at the beginning of a quiz. The screen provides information relating to the quiz, as well as details and instructions. Timing of the quiz does not begin until the first question of the quiz has been displayed.

FIG. 38 is an example screen presenting a question to a user. The question format depicted is multiple choice, but other question formats are contemplated, such as fill in the blank, or the like. The time required to answer the question may be recorded by the system.

FIG. 39 is an example screen that may be displayed when a student answers a question incorrectly. This provides immediate feedback to the user.

Figure 40:
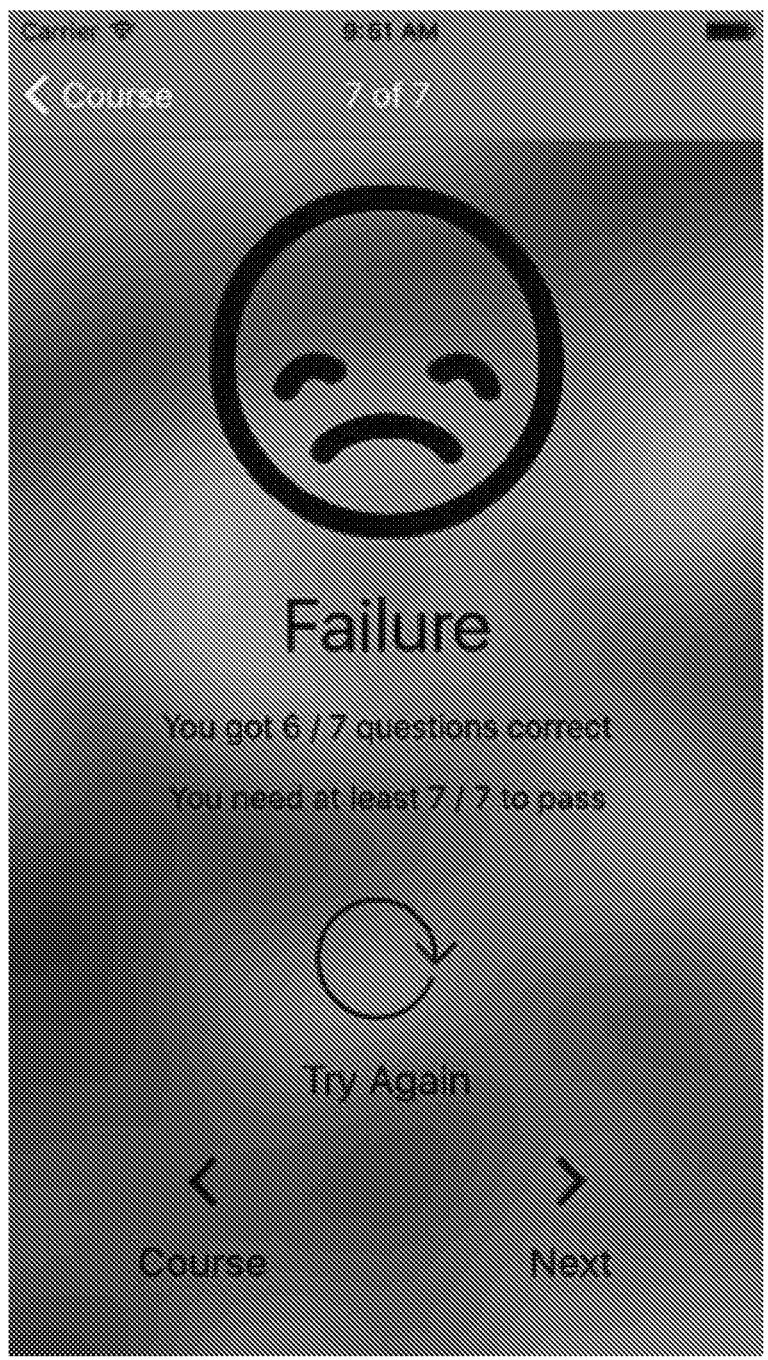

FIG. 40 is an example screen that may be displayed when a student has failed to achieve the passing grade on an assessment.

Figure 41:
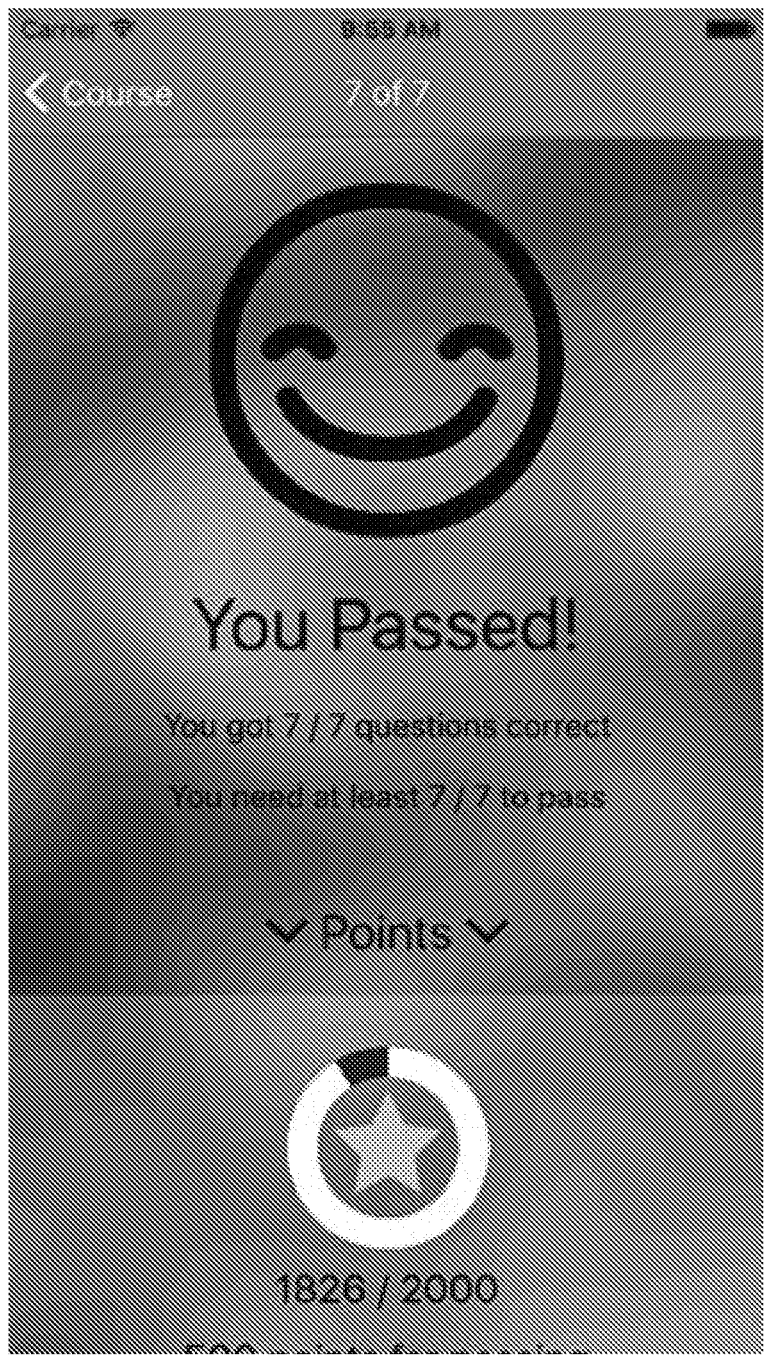

FIG. 41 is an example screen that may be displayed when a student has achieved a passing grade on an evaluation. The screen may also list the points awarded and any other associated achievements.

Figure 42:
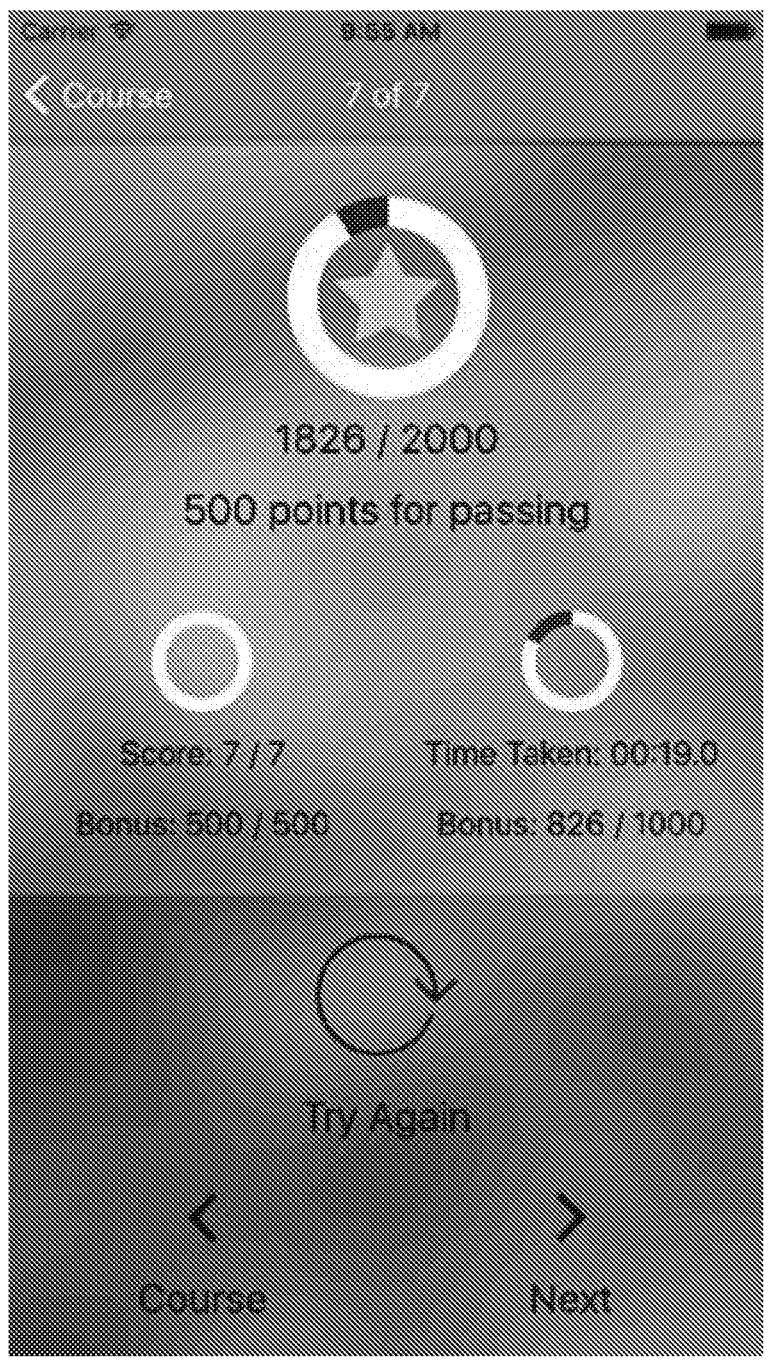

FIG. 42 is an example screen showing the points area of the assessment pass screen. In this example, there is a reward both for passing, as well as the time taken. Each of the different scores may be measured and passed to processing networks for analytics.

Figure 43:
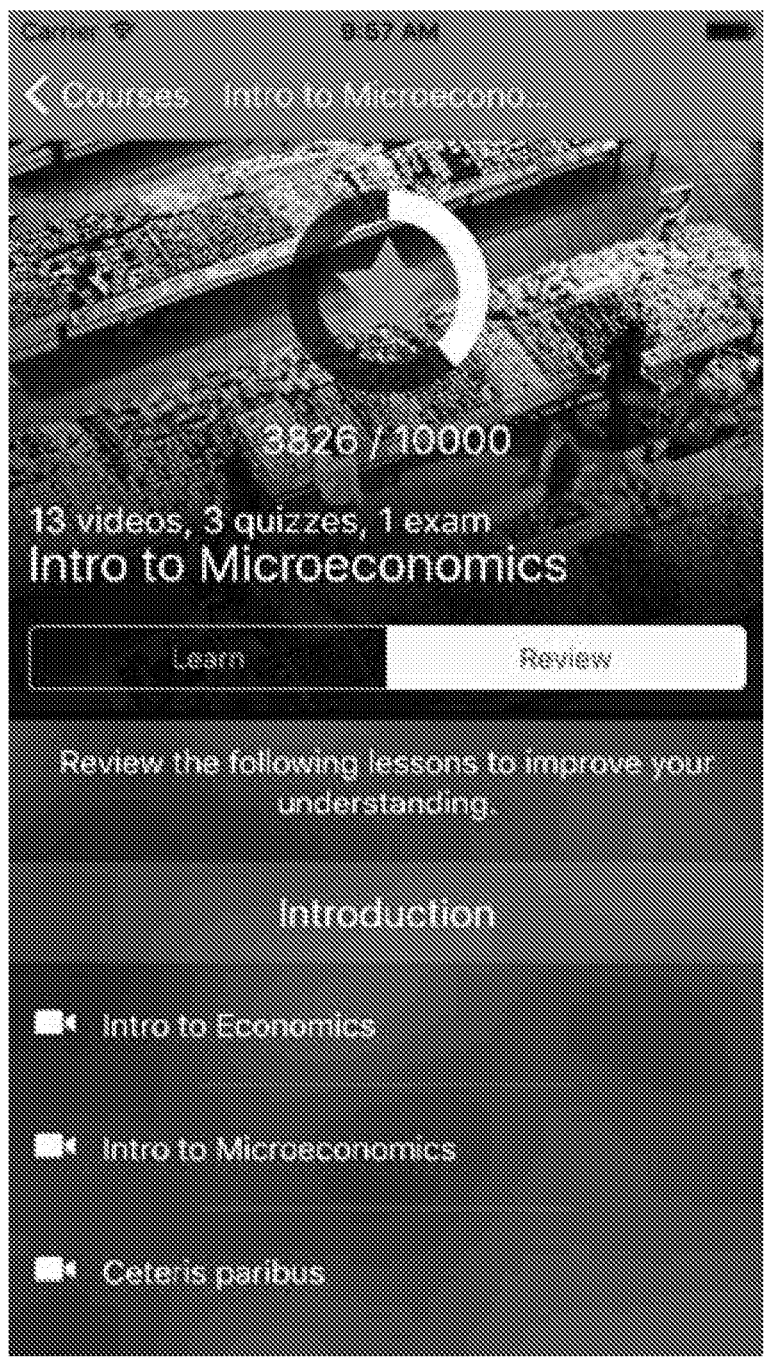

FIG. 43 is an example review screen showing lessons that a student should focus on. A review course may be generated by the prediction system. The contents of a review course may vary depending on the student or on the student's performance over time.

Various embodiments of the systems and methods described herein may address some or all of the challenges faced by students who desire to improve their education. Through mixed media interactions of varying length, students may quickly and efficiently consume course material in a manner previously not available. Moreover, the design of the system may allow for intelligent understanding of contexts and the creating or synthesizing of additional content by the system.

Some embodiments of the systems and methods described herein may encourage students through the use of achievements, support students through conversations and tasks, and support students by peer-instructors who can monitor and provide feedback. Students may also passively or actively compete with one another to provide extra motivation in specific areas.

In some embodiments, part or all of the processes described herein may be performed at client device 110 or server 102.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the detailed embodiments described above and illustrated are examples only. The invention is defined by the appended claims.

What is claimed is:

1. A computer-implemented method of presenting education content to at least one user on a computing device, the method comprising:
   receiving, by a processor, data from a data store relating to the at least one user's performance in a course having a proficiency average, said course comprising a plurality of questions, said data including, for each of said plurality of questions, an amount of time elapsed between presentation of a respective question and an answer to said respective question from said at least one user, a number of times said respective question has been asked, and a number of times said respective question has been answered correctly;
   training, by the processor, a recurrent neural network by:
      creating a first training set comprising the data relating to the at least one user's performance in a first of said plurality of questions and said proficiency average;
      creating a second training set comprising the data relating to the at least one user's performance in the first of said plurality of questions and at least a second of said plurality of questions and said proficiency average;
      creating at least a third training set comprising the data relating to the at least one user's performance in each of said plurality of questions in said course and said proficiency average; and
      training, at a single time instance, said recurrent neutral network using each of said first training set, said second training set, and said third training set;
   selecting, by the processor, a plurality of content items including at least one question, wherein selecting the at least one question comprises:
      for the at least one question, determining, by the processor, a probability that the at least one question will be answered correctly using the recurrent neural network; and
      selecting said at least one question based on said at least one question having a probability of being answered correctly by said at least one user that is less likely than a threshold probability; and
   presenting said plurality of selected content items including said at least one question to said at least one user on a client device associated with said at least one user.

2. The method of claim 1, wherein presenting said plurality of selected content items comprises presenting said plurality of content items to at least two users on at least two respective client devices associated with said at least two of said at least one-users.

3. The method of claim 1, further comprising receiving a response to said at least one question from said at least one user via said client device associated with said at least one user.

4. The method of claim 1, wherein said data further includes one or more of time elapsed since a previous group of questions was consumed by said at least one user, and total length of time said group of questions was consumed by said at least one user.

5. The method of claim 1, wherein said client device is one of a smartphone, computing device, and smartwatch.

6. The method of claim 1, wherein presenting said plurality of selected content items comprises presenting a test to said at least one user.

* * * * *